(12) United States Patent
Ito et al.

(10) Patent No.: US 10,741,030 B2
(45) Date of Patent: Aug. 11, 2020

(54) RECEPTION APPARATUS AND METHOD, AND TRANSMISSION APPARATUS AND METHOD

(71) Applicant: SONY CORPORATION, Tokyo (JP)

(72) Inventors: Osamu Ito, Tokyo (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/332,968

(22) PCT Filed: Sep. 20, 2017

(86) PCT No.: PCT/JP2017/033797
§ 371 (c)(1),
(2) Date: Mar. 13, 2019

(87) PCT Pub. No.: WO2018/066354
PCT Pub. Date: Apr. 12, 2018

(65) Prior Publication Data
US 2019/0279472 A1    Sep. 12, 2019

(30) Foreign Application Priority Data
Oct. 4, 2016   (JP) .................................. 2016-196385

(51) Int. Cl.
*H04B 3/36* (2006.01)
*G08B 6/00* (2006.01)
(Continued)

(52) U.S. Cl.
CPC ................. *G08B 6/00* (2013.01); *A41D 1/00* (2013.01); *A41D 1/005* (2013.01); *A41D 13/00* (2013.01);
(Continued)

(58) Field of Classification Search
CPC ................................. G08B 6/00; H04W 28/04
(Continued)

(56) References Cited

U.S. PATENT DOCUMENTS 6,188,916 B1   2/2001 Noda et al.
6,799,052 B2 * 9/2004 Agness ................ H04B 1/3805
                                             455/456.4
(Continued)

FOREIGN PATENT DOCUMENTS

CN    1184583 A    6/1998
CN    103181198 A   6/2013
(Continued)

OTHER PUBLICATIONS

International Search Report and Written Opinion of PCT Application No. PCT/JP2017/033797, dated Nov. 21, 2017, 09 pages of ISRWO.

*Primary Examiner* — Tai T Nguyen
(74) *Attorney, Agent, or Firm* — Chip Law Group

(57) ABSTRACT

The present disclosure relates to a reception apparatus and method, a transmission apparatus and method, and a program, capable of obtaining desired communication quality. Under the control of a central control unit, a tactile signal generation unit generates a tactile signal of a necessary number. Under the control of the central control unit, a header generation unit generates header information including the presence or absence of the tactile signal (that is, information indicating whether or not the tactile signal is to be used for each of vibration units as information associated with the vibration unit that uses the tactile signal), the delay amount, and the magnitude. A signal coupling unit adds header information to each of the tactile signals from the tactile signal generation unit, and performs time-division multiplexing on each of the tactile signals to which the header information has been added. The present disclosure (Continued)

can be applied to a tactile presentation system that vibrates a wearable reception apparatus including the vibration unit, for example.

12 Claims, 22 Drawing Sheets

(51) Int. Cl.
*A41D 1/00* (2018.01)
*G05D 19/02* (2006.01)
*G06F 3/01* (2006.01)
*G08C 15/06* (2006.01)
*G08C 17/02* (2006.01)
*H04J 3/16* (2006.01)
*A41D 13/00* (2006.01)
*A61H 23/00* (2006.01)
*H04J 3/00* (2006.01)

(52) U.S. Cl.
CPC ............ *A61H 23/00* (2013.01); *G05D 19/02* (2013.01); *G06F 3/01* (2013.01); *G08C 15/06* (2013.01); *G08C 17/02* (2013.01); *H04J 3/00* (2013.01); *H04J 3/1676* (2013.01)

(58) Field of Classification Search
USPC ......... 340/407.1, 407.2, 540, 541, 635, 665; 455/566, 567, 574, 575.3
See application file for complete search history.

(56) References Cited

U.S. PATENT DOCUMENTS

| | | | |
|---|---|---|---|
| 7,333,604 B2* | 2/2008 | Zernovizky | H04M 19/044 379/388.03 |
| 7,469,155 B2* | 12/2008 | Chu | H04M 1/72569 455/456.1 |
| 2014/0348348 A1 | 11/2014 | Efrati | |

FOREIGN PATENT DOCUMENTS

| | | |
|---|---|---|
| EP | 0830044 A1 | 3/1998 |
| EP | 2612424 A1 | 7/2013 |
| JP | 3034033 U | 2/1997 |
| JP | 2000-049956 A | 2/2000 |
| JP | 2001-128257 A | 5/2001 |
| JP | 2006-075715 A | 3/2006 |
| JP | 2013-541264 A | 11/2013 |
| KR | 10-2013-0036766 A | 4/2013 |
| WO | 97/36448 A1 | 10/1997 |
| WO | 2011/158355 A1 | 12/2011 |
| WO | 2012/028973 A1 | 3/2012 |

\* cited by examiner

RECEPTION APPARATUS AND METHOD, AND TRANSMISSION APPARATUS AND METHOD

CROSS REFERENCE TO RELATED APPLICATIONS

This application is a U.S. National Phase of International Patent Application No. PCT/JP2017/033797 filed on Sep. 20, 2017, which claims priority benefit of Japanese Patent Application No. JP 2016-196385 filed in the Japan Patent Office on Oct. 4, 2016. Each of the above-referenced applications is hereby incorporated herein by reference in its entirety.

TECHNICAL FIELD

The present disclosure relates to a reception apparatus and method, a transmission apparatus and method, and a program, and in particular, to a reception apparatus and method, a transmission apparatus and method, and a program capable of obtaining desired communication quality.

BACKGROUND ART

Conventionally, there is a device that vibrates to give a user tactile sensations (refer to Patent Document 1).

CITATION LIST

Patent Document

Patent Document 1: Japanese Patent Application Laid-Open No. 2011-59821

SUMMARY OF THE INVENTION

Problems to be Solved by the Invention

In a case where a wearable presentation device such as a jacket is used, connecting the device to a system main body with a wired cable would degrade the degree of freedom and lower its experiential value. Therefore, tactile signals for presentation need to be prepared in the presentation device in the jacket or need to be transmitted to the presentation device from the system main body by using a radio channel. At that time, implementation of tactile presentation toward just a few locations in the jacket would be sufficiently managed with the use of the existing radio system.

However, in a case where tactile presentation is to be provided to a large number of locations (ten locations or more) in order to raise the experiential value, there are problems such as insufficient channels (CH) and deterioration of communication quality just with the existing radio system.

The present disclosure has been made in view of such a situation, and aims to obtain desired communication quality.

Solutions to Problems

A reception apparatus according to an aspect of the present technology includes: a vibration unit that performs vibration; a reception unit that receives a time-division multiplexed signal obtained by performing time-division multiplexing on a signal obtained by adding a header including description of information associated with a vibration unit that uses a tactile signal including a waveform of vibration for vibrating the vibration unit, to the tactile signal; a separation unit that separates the tactile signal and the header from the time-division multiplexed signal received by the reception unit; and a signal adjustment unit that adjusts the tactile signal separated by the separation unit in accordance with the header separated by the separation unit, in which the vibration unit performs vibration based on the tactile signal adjusted by the signal adjustment unit.

The information associated with the vibration unit that uses the tactile signal is information indicating whether or not the vibration unit is to use the tactile signal for each of the vibration units.

The signal adjustment unit can perform processing of muting the tactile signal separated by the separation unit in a case where the header indicates that the vibration unit is not to use the tactile signal.

The header includes description of gain information and delay information for each of the vibration units.

The header includes description of a gain initial value and slope for each of the vibration units.

The Information associated with the vibration unit that uses the tactile signal is information for identifying a plurality of vibration units that uses the tactile signal.

The header includes description of a gain initial value and the slope for each of the plurality of vibration units.

The Information associated with the vibration unit that uses the tactile signal is information for identifying a group including the plurality of vibration units that uses the tactile signal.

The header includes description of a position and time of vibration. The reception apparatus further includes a gain calculation unit that analyzes a header separated by the separation unit and refers to a table so as to obtain a gain change between the vibration units belonging to the group, and the signal adjustment unit can adjust the tactile signal separated by the separation unit in accordance with the header separated by the separation unit and the gain change calculated by the gain calculation unit.

The reception apparatus is formed as a wearable apparatus to be worn by a user.

A reception method according to an aspect of the present technology is a reception method including executing, by a reception apparatus: receiving a time-division multiplexed signal obtained by performing time-division multiplexing on a signal obtained by adding a header including description of information associated with a vibration unit that uses a tactile signal including a waveform of vibration for vibrating the vibration unit that performs vibration, to the tactile signal; separating the tactile signal and the header from the time-division multiplexed signal received; adjusting the separated tactile signal in accordance with the separated header; and performing vibration based on the adjusted tactile signal.

A program according to an aspect of the present technology causes a computer to function as: a reception unit that receives a time-division multiplexed signal obtained by performing time-division multiplexing on a signal obtained by adding a header including description of information associated with a vibration unit that uses a tactile signal including a waveform of vibration for vibrating the vibration unit that performs vibration, to the tactile signal; a separation unit that separates the tactile signal and the header from the time-division multiplexed signal received by the reception unit; a signal adjustment unit that adjusts the tactile signal separated by the separation unit in accordance with the header separated by the separation unit; and the vibration unit that performs vibration based on the tactile signal adjusted by the signal adjustment unit.

A transmission apparatus according to another aspect of the present technology includes: a tactile signal generation unit that generates a tactile signal including a waveform of vibration for vibrating a vibration unit; a header generation unit that generates a header including description of information associated with the vibration unit that uses a tactile signal generated by the tactile signal generation unit; a time-division multiplexing unit that performs time-division multiplexing on the tactile signal generated by the tactile signal generation unit and to which the header generated by the header generation unit has been added; and a transmission unit that transmits the signal time-division multiplexed by the time-division multiplexing unit.

The information associated with the vibration unit that uses the tactile signal is information indicating whether or not the vibration unit is to use the tactile signal for each of the vibration units.

The header includes description of gain information and delay information for each of the vibration units.

The information associated with the vibration unit that uses the tactile signal is information associated with operation of the plurality of vibration units that uses the tactile signal.

The Information associated with the vibration unit that uses the tactile signal is information for identifying a group including the plurality of vibration units that uses the tactile signal.

The reception apparatus provided with the vibration unit is formed as a wearable apparatus to be worn by a user.

A transmission method according to another aspect of the present technology includes executing, by a transmission apparatus: generating a tactile signal including a waveform of vibration for vibrating a vibration unit; generating a header including description of information associated with the vibration unit that uses the generated tactile signal; performing time-division multiplexing on the tactile signal generated by the tactile signal generation unit and to which the header generated by the header generation unit has been added; and transmitting the time-division multiplexed signal.

A program according to another aspect of the present technology causes a computer to function as: a tactile signal generation unit that generates a tactile signal including a waveform of vibration for vibrating a vibration unit; a header generation unit that generates a header including description of information associated with a vibration unit that uses the tactile signal generated by the tactile signal generation unit; a time-division multiplexing unit that performs time-division multiplexing on the tactile signal generated by the tactile signal generation unit and to which the header generated by the header generation unit has been added; and a transmission unit that transmits the signal time-division multiplexed by the time-division multiplexing unit.

In one aspect of the present technology, a time-division multiplexed signal obtained by performing time-division multiplexing on a signal obtained by adding a header including description of information associated with a vibration unit that uses a tactile signal including a waveform of vibration for vibrating the vibration unit that performs vibration, to the tactile signal, is received. Subsequently, the tactile signal and the header are separated from the time-division multiplexed signal received, the separated tactile signal is adjusted in accordance with the separated header, and vibration based on the adjusted tactile signal is performed.

In another aspect of the present technology, a tactile signal including a waveform of vibration for vibrating a vibration unit is generated, and a header including description of information associated with the vibration unit that uses the generated tactile signal is generated. Subsequently, the tactile signal to which the generated header has been added is time-division multiplexed, and the time-division multiplexed signal is transmitted.

Effects of the Invention

According to the present technology, desired communication quality can be obtained, in particular.

Note that effects described in the present description are provided for purposes of exemplary illustration and effects of the present technology are not intended to be limited to the effects described in the present description, and still other additional effects may also be contemplated.

MODE FOR CARRYING OUT THE INVENTION

Hereinafter, embodiments of the present disclosure (hereinafter, embodiment(s)) will be described. Note that description will be presented in the following order.
1. First Embodiment
2. Second Embodiment
3. Third Embodiment

1. First Embodiment

<Configuration Example of Tactile Presentation System>

Figure 1:
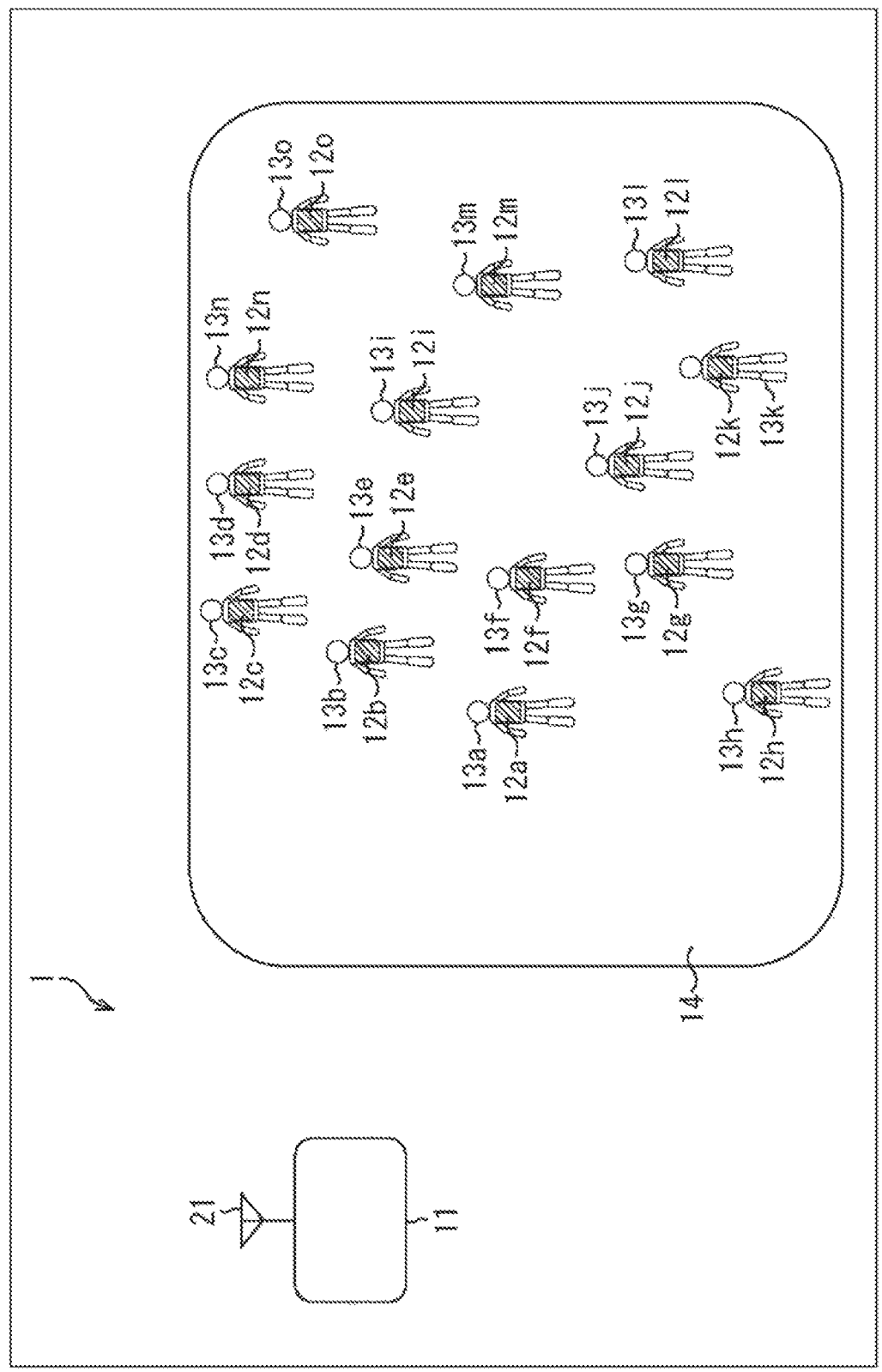
FIG. 1 is a diagram illustrating an exemplary configuration of a tactile presentation system according to the present technology.

FIG. 1 is a diagram illustrating an exemplary configuration of a tactile presentation system according to the present technology. Note that the tactile presentation represents giving vibration. Accordingly, hereinafter, vibration is also referred to as tactile presentation.

In the example of FIG. 1, a tactile presentation system 1 includes a transmission apparatus 11, wearable reception apparatuses 12a to 12o worn by users 13a to 13o, and a reception area 14. Note that the wearable reception apparatuses 12a to 12o are referred to as a wearable reception apparatus 12 unless distinction is needed in particular, and the users 13a to 13o are appropriately referred to as the user 13 unless distinction is needed in particular.

The transmission apparatus 11 is configured to be movable, and includes an antenna 21.

The antenna 21 is omnidirectional and transmits a broadcasting signal toward the reception area 14. Note that the antenna 21 may be directional. In this case, the antenna 21 has a video projection function and transmits a specific-area oriented signal toward a specific area (not illustrated) within the reception area 14 to which a video is projected by the video projection function.

The wearable reception apparatus 12 is a reception apparatus of a jacket (vest) shape worn by the user 13. The wearable reception apparatus 12 receives a signal from the antenna 21 within the reception area 14. The wearable reception apparatus 12 includes a vibration unit (actuator) 31 for vibrating the body of the user 13, and vibrates the body of the user 13 in accordance with a signal from the antenna 21.

The user 13 is one of a plurality of users wearing the wearable reception apparatus 12 and is freely moving within the reception area 14. The reception area 14 is an area capable of receiving a signal from the antenna 21.

Figure 2:
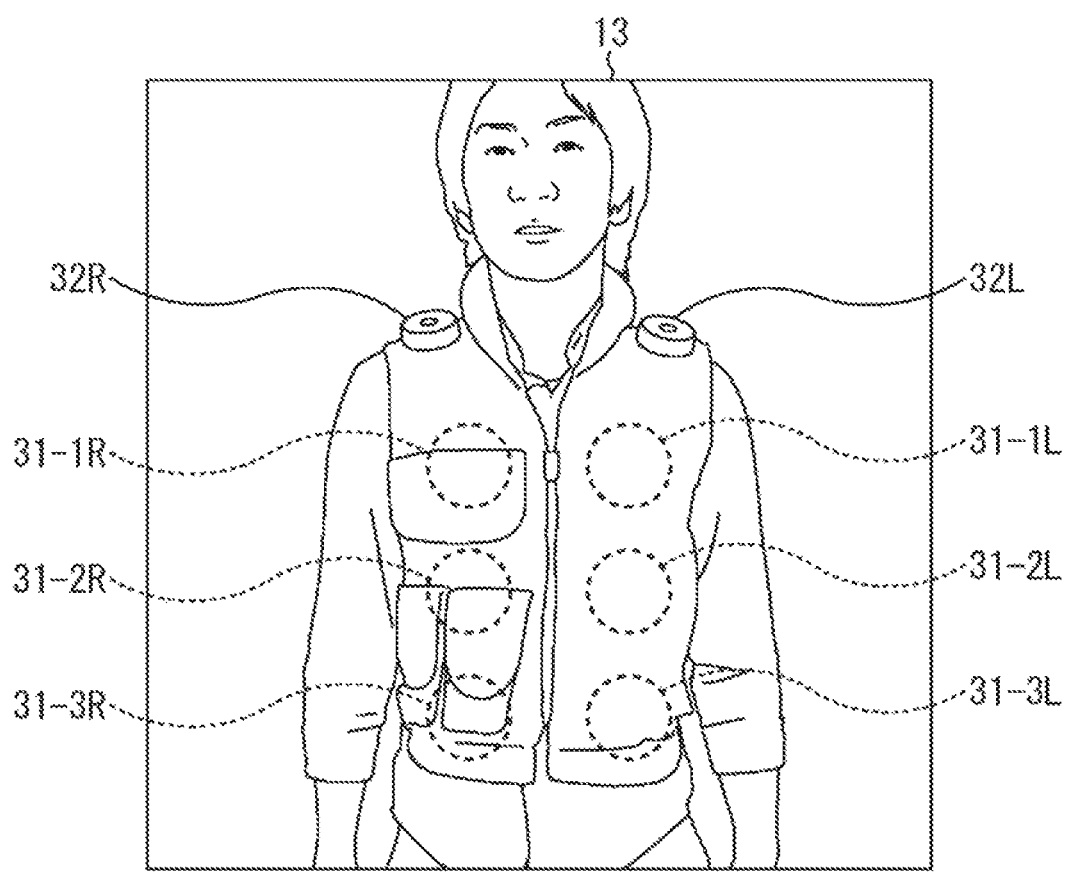
FIG. 2 is a view illustrating a configuration example of an appearance of a wearable reception apparatus.

FIG. 2 is a view illustrating a configuration example of an appearance of the wearable reception apparatus 12.

As illustrated in FIG. 2, the wearable reception apparatus 12 is formed with a wearable jacket, and includes vibration units 31-1R to 31-3R as tactile presentation devices, and vibration unit 31-1L to 31-3L provided in left-right pairs on chest to abdominal regions. The vibration units 31-1R to 31-3R and the vibration units 31-1L to 31-3L may vibrate at a same timing or may vibrate at different timings, respectively. Furthermore, speakers 32R and 32L are provided on shoulder portions of the jacket, whereby the user 13 can receive vibration of the vibration units 31-1R to 31-3R and the vibration units 31-1L to 31-3L and sounds from the speakers 32R and 32L and can thereby enjoy tactile sensation and sound full of realistic feeling.

Note that the vibration units 31-1R to 31-3R and the vibration units 31-1L to 31-3L are referred to as the vibration unit 31 unless distinction is needed in particular. While the example of FIG. 2 illustrates an exemplary case where number of the vibration unit 31 is six, the actual number of the vibration unit 31 is ten or more, for example. Note that the number of vibration units 31 is not limited to ten or more, and may be any number as long as it is more than one. Additionally, the speakers 32R and 32L will also be referred to as a speaker 32 unless distinction is needed in particular. Note that for convenience of explanation, the vibration unit 31 will be simply referred to as an actuator in some cases.

Figure 3:
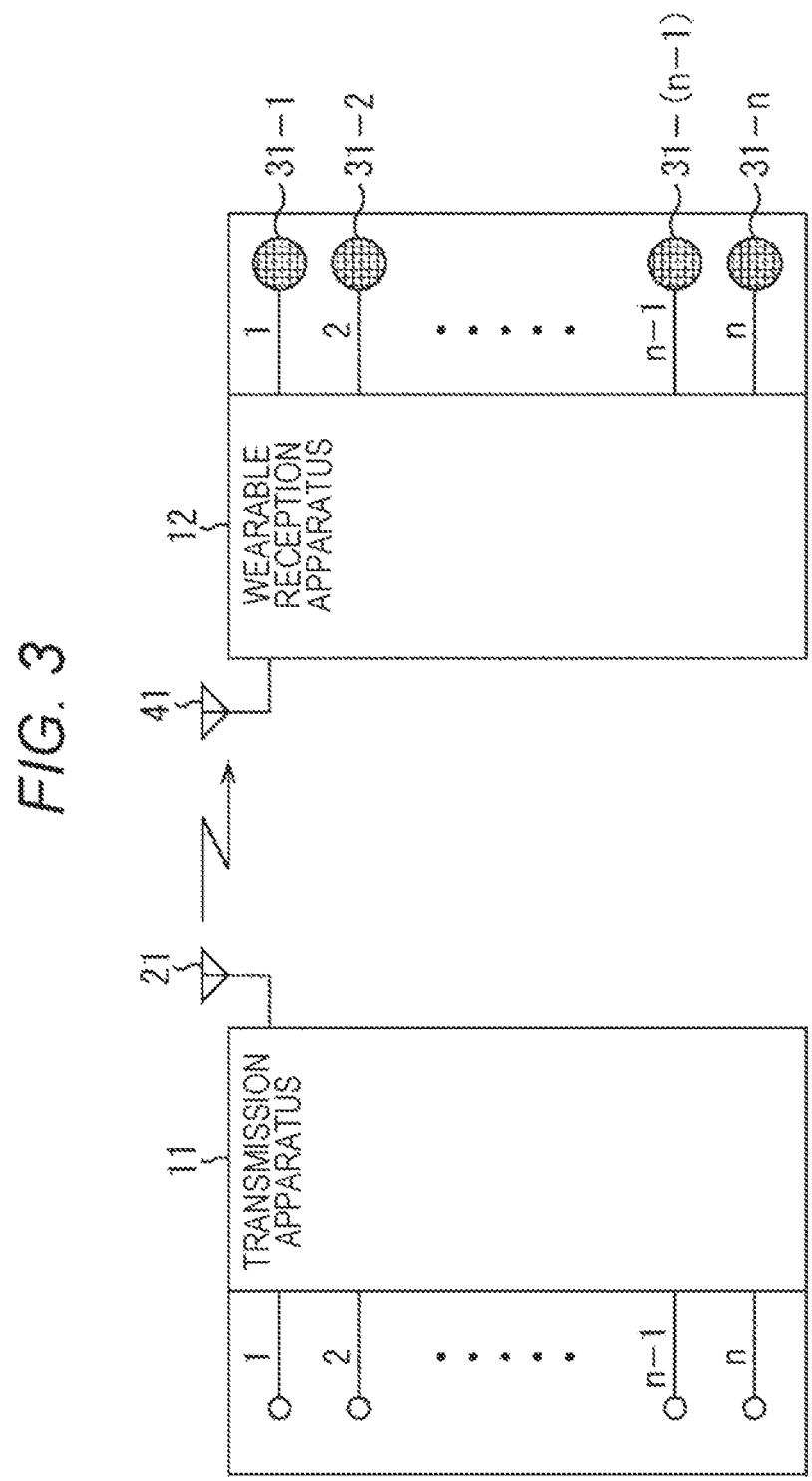
FIG. 3 is a diagram illustrating a configuration example of a transmission apparatus and a wearable reception apparatus of the tactile presentation system.

FIG. 3 is a diagram illustrating a configuration example of a transmission apparatus and a wearable reception apparatus of the tactile presentation system.

In the tactile presentation system 1 of FIG. 3, the transmission apparatus 11 includes the antenna 21, and selects only the signal line that carries a tactile signal to the vibration units 31-1 to 31-n among tactile signals 1 to n, and transmits the signal via the antenna 21.

The wearable reception apparatus 12 includes an omnidirectional antenna 41, for example. Note that the antenna 41 may have directivity or need not have directivity, regardless of the presence or absence of directivity on the transmission side. The wearable reception apparatus 12 reads the correspondence of the tactile signal received via the antenna 41 to the order of the vibration unit 31, and outputs the tactile signal to the vibration unit 31 corresponding to the number out of the vibration units 31-1 to 31-n.

As described above, in order to transfer the corresponding number between the transmission side and the reception side, the tactile presentation system 1 transmits header information before transmission of the tactile signal.

Figure 4:
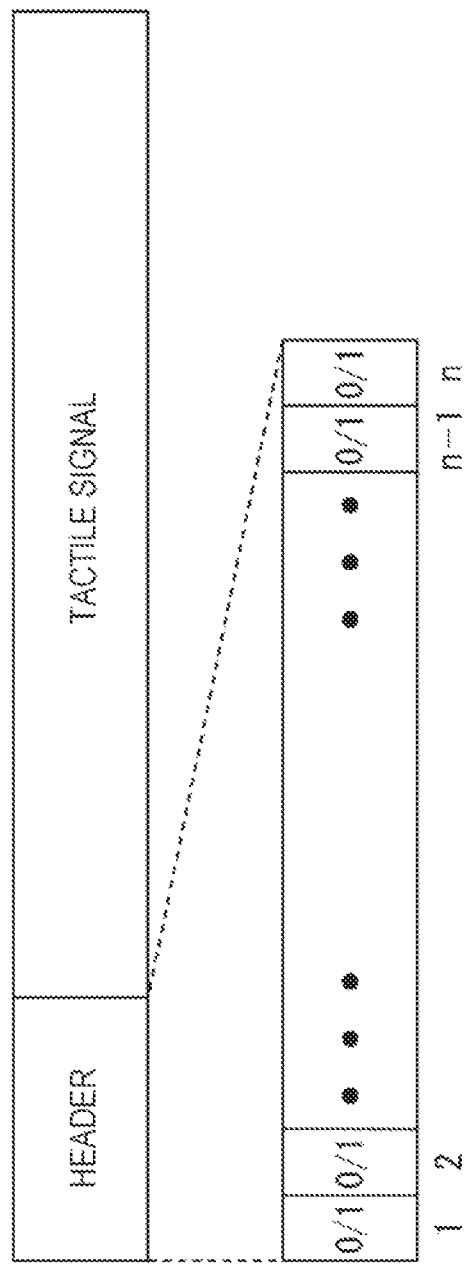
FIG. 4 is a diagram illustrating a packet configuration example including header information.

FIG. 4 is a diagram illustrating a packet configuration example including header information. In the packet configuration, a tactile signal is provided after the header. In the header, it is prescribed such that a value (0/1) corresponding to the number of each of the vibration units 31 being "1" means the presence of a tactile signal (this tactile signal is to be used), and the value being "0" means the absence of the tactile signal (this tactile signal is not to be used). That is, header includes information indicating whether or not to use the tactile signal for each of the vibration units, as information associated with the vibration unit that uses a tactile signal.

<Configuration Example of Transmission Apparatus>

Figure 5:
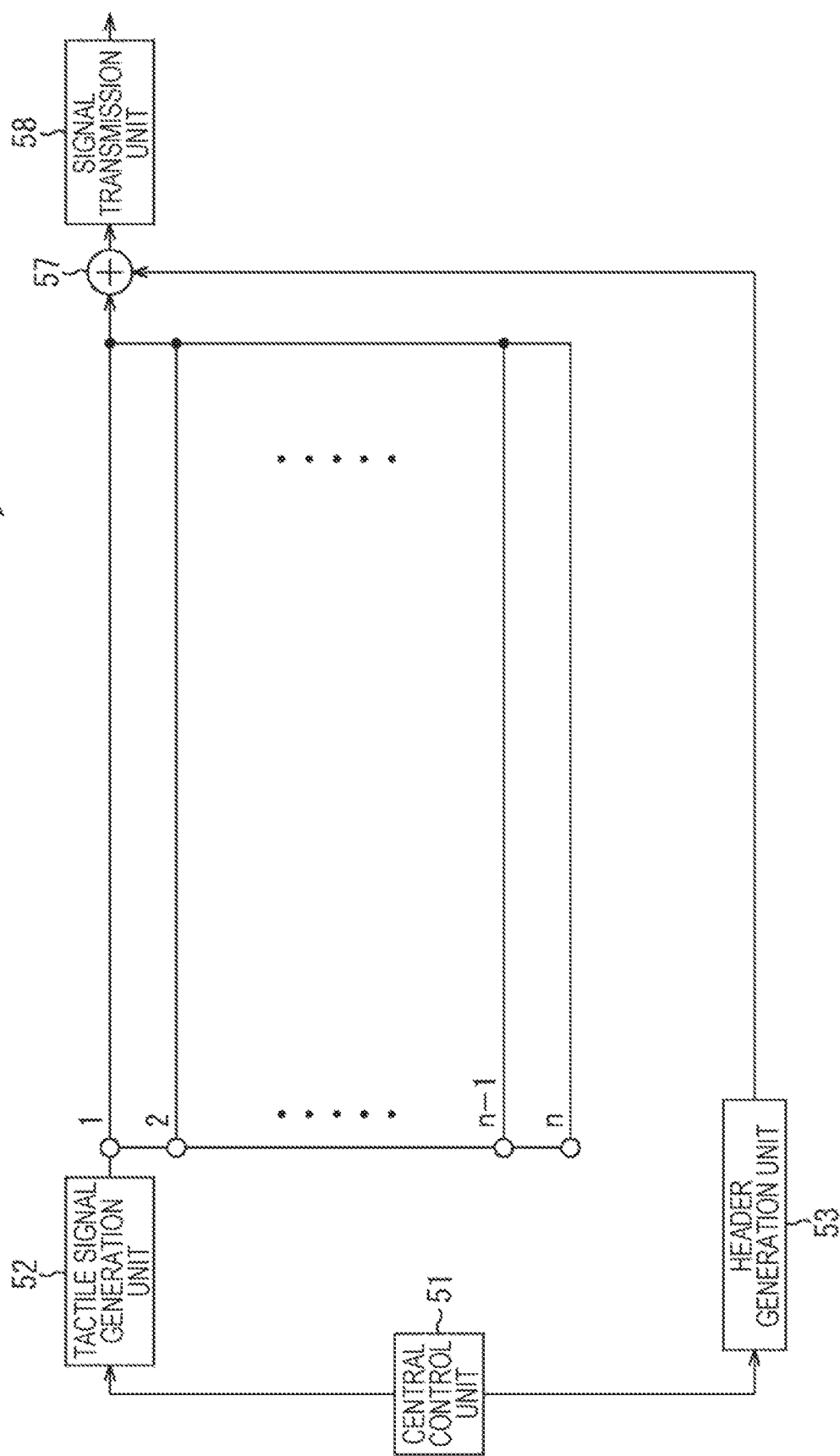
FIG. 5 is a block diagram illustrating an exemplary configuration of a transmission apparatus.

FIG. 5 is a block diagram illustrating an exemplary configuration of a transmission apparatus.

In the example of FIG. 5, the transmission apparatus 11 includes a central control unit 51, a tactile signal generation unit 52, a header generation unit 53, a signal coupling unit 57, and a signal transmission unit 58.

The central control unit 51 is constituted by a CPU and the like, for example, and controls generation of tactile signals by the tactile signal generation unit 52, header generation by the header generation unit 53 and the like on the basis of the way of vibrating the vibration unit 31 on the basis of an operation signal from an operation unit (not illustrated) from the user. For example, the central control unit 51 issues an instruction to the tactile signal generation unit 52 indicating "outputting a tactile signal of pattern A to the vibration unit 31-1R". While the following description will use this instruction method, the method of instructing the tactile signal generation unit 52 by the central control unit 51 can include "a ball hit", for example. In this case, the tactile signal generation unit 52 processes which vibration unit 31 is to be vibrated. At that time, the information associated with the vibration unit 31 to be used is logically transmitted from the tactile signal generation unit 52 to the header generation unit 53.

Note that, as will be described in detail later, for example, in a case where an identical tactile signal is output to the vibration unit 31-1 and the vibration unit 31-2, a tactile signal for the vibration unit 31-1 is to be generated and a tactile signal for the vibration unit 31-2 is not to be generated, and instead, the use of the vibration unit 31-2 is set to 1 in the header of the tactile signal for the vibration unit 31-1. Furthermore, in a case where the tactile signal for the vibration unit 31-3 is different from the tactile signal of the vibration unit 31-1 merely in gain, the tactile signal for the vibration unit 31-3 is not to be generated and instead, the use of the vibration unit 31-3 is set to 1 in the header of the tactile signal for the vibration unit 31-1 with insertion of a gain value, or the like. In this manner, the central control unit 51 comprehensively controls individual portions of the transmission apparatus 11.

Under the control of the central control unit 51, the tactile signal generation unit 52 generates a tactile signal of a necessary number, and outputs the generated tactile signal to the signal coupling unit 57, individually. Note that the tactile signal does not indicate vibration of all the vibration units 31 and there are cases where 0 is transmitted, or the signal can be a discrete signal as well.

Under the control of the central control unit 51, the header generation unit 53 generates header information including the presence or absence of a tactile signal (that is, information indicating whether or not a tactile signal is to be used for each of vibration units), the delay amount, and the magnitude, and outputs the generated header information to the signal coupling unit 57.

The signal coupling unit 57 adds the header information to each of the tactile signals from the tactile signal generation unit 52, and performs time-division multiplexing on each of the tactile signals from the tactile signal generation unit 52 to which header information has been added, and then, outputs the time-division multiplexed signal to the signal transmission unit 58. That is, a header is generated in order to perform time-division multiplexing on each of tactile signals from the tactile signal generation unit 52.

The signal transmission unit 58 transmits the signal time-division multiplexed by the signal coupling unit 57 as a radio signal via the antenna 21.

<Example of Operation of Transmission Apparatus>

Figure 6:
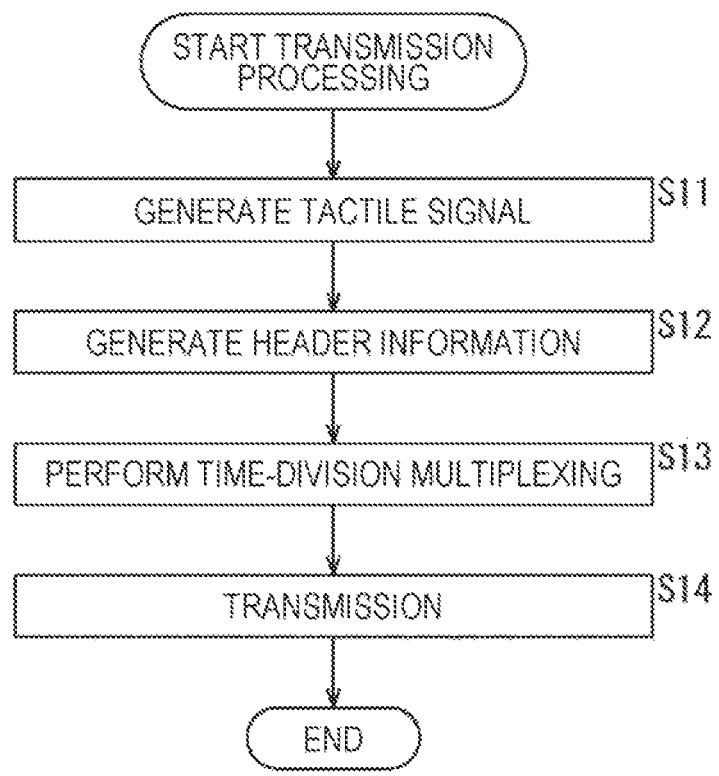
FIG. 6 is a flowchart illustrating transmission processing of a transmission apparatus.

Next, transmission processing of the transmission apparatus 11 will be described with reference to FIG. 6.

In step S11, under the control of the central control unit 51, the tactile signal generation unit 52 generates a tactile signal of a necessary number, and outputs the generated tactile signal to the signal coupling unit 57.

In step S12, under the control of the central control unit 51, the header generation unit 53 generates header information including the presence or absence of a tactile signal, the delay amount, and the magnitude, and outputs the generated header information to the signal coupling unit 57.

In step S13, the signal coupling unit 57 adds header information from the header generation unit 53 to each of tactile signals from the tactile signal generation unit 52, respectively, and time-division multiplexes each of the tactile signals to which the header information has been added, and then, outputs the time-division multiplexed signal to the signal transmission unit 58.

In step S14, the signal transmission unit 58 transmits the signal time-division multiplexed by the signal coupling unit 57 as a radio signal via the antenna 21.

<Exemplary Configuration of Reception Apparatus>

Figure 7:
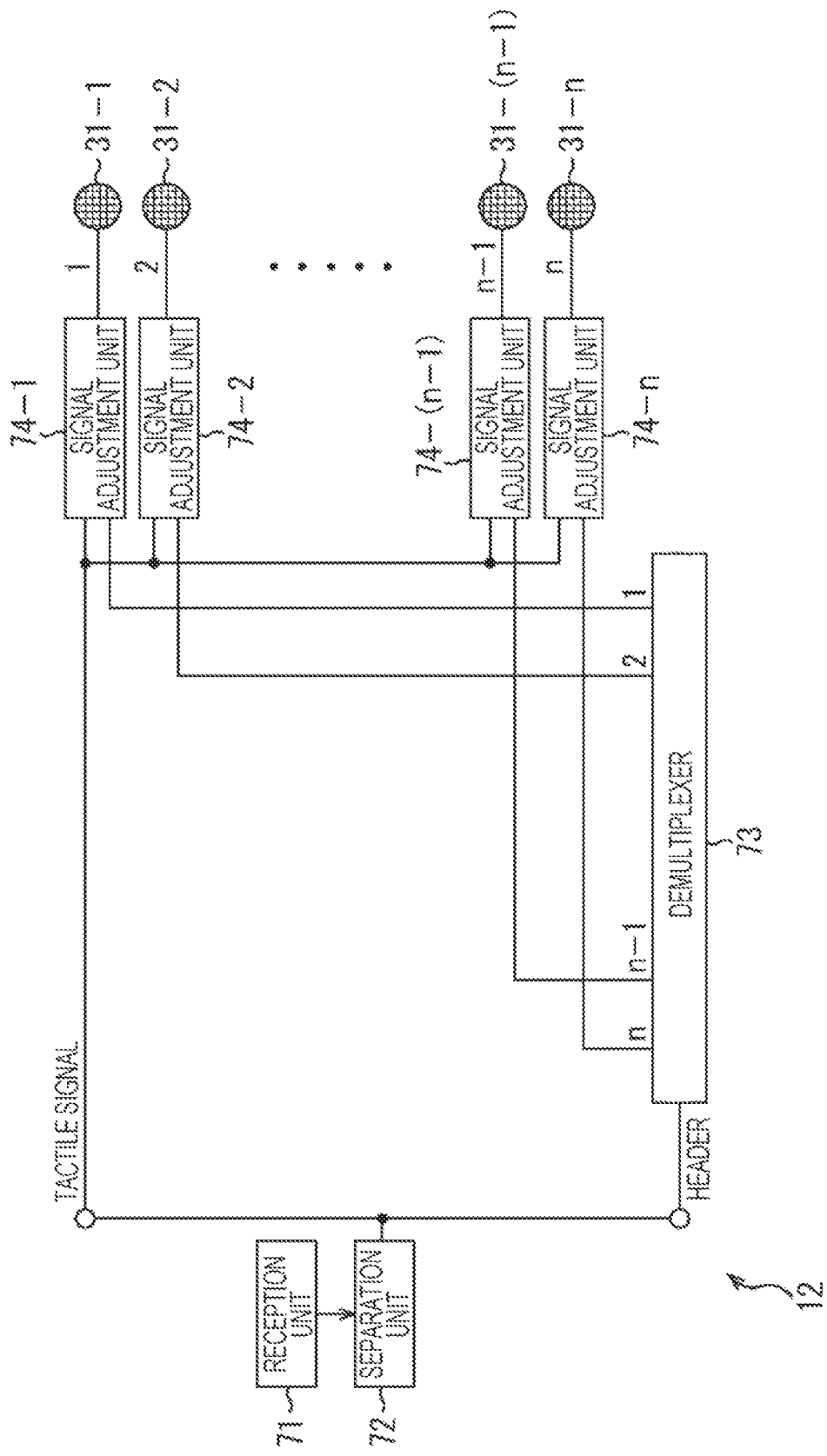
FIG. 7 is a block diagram illustrating an exemplary configuration of a wearable reception apparatus.

FIG. 7 is a block diagram illustrating an exemplary configuration of a reception apparatus.

In the example of FIG. 7, the wearable reception apparatus 12 includes a reception unit 71, a separation unit 72, a demultiplexer 73, signal adjustment units 74-1 to 74-n, and vibration units 31-1 to 31-n.

The reception unit 71 receives the radio signal (time-division multiplexed signal) via the antenna 41, and outputs the received radio signal to the separation unit 72. The separation unit 72 separates the header and the tactile signal from the signal from the reception unit 71, outputs the separated header to the demultiplexer 73, and outputs the separated tactile signal to each of the signal adjustment units 74-1 to 74-n.

The demultiplexer 73 extracts the header information of each of tactile signals corresponding to 1 to n from the header and outputs the extracted information to each of the signal adjustment units 74-1 to 74-n of the corresponding number. The signal adjustment units 74-1 to 74-n perform signal adjustment such as mute, delay, gain, or the like, on the basis of the corresponding header information from the demultiplexer 73, and output the tactile signals subjected to individual adjustments to the vibration units 31-1 to 31-n of corresponding numbers. Correspondingly, the vibration units 31-1 to 31-n vibrate on the basis of the tactile signal.

Note that, hereinafter, the signal adjustment units 74-1 to 74-n will be referred to as a signal adjustment unit 74 unless distinction is needed in particular.

Figure 8:
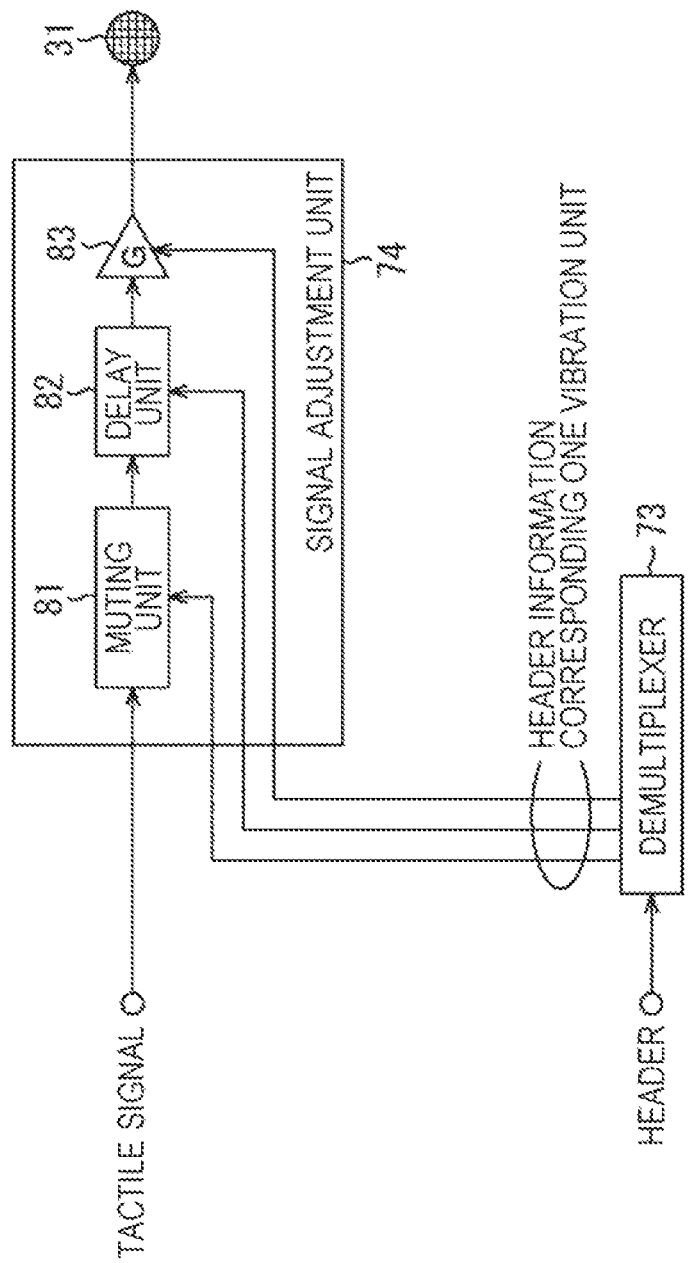
FIG. 8 is a block diagram illustrating an exemplary configuration of the signal adjustment unit.

FIG. 8 is a block diagram illustrating an exemplary configuration of the signal adjustment unit 74.

In the example of FIG. 8, the signal adjustment unit 74 corresponds to one vibration unit 31, and includes a muting unit 81, a delay unit 82, and a gain processing unit 83.

The muting unit 81 mutes the tactile signal in accordance with the header information corresponding to one vibration unit 31 transmitted from the demultiplexer 73 and outputs the tactile signal to the delay unit 82. That is, the muting unit 81 mutes the tactile signal when the vibration unit is not to use the tactile signal. The delay unit 82 delays the tactile signal in accordance with the header information from the demultiplexer 73 and outputs the tactile signal to the gain processing unit 83. The gain processing unit 83 applies gain on the tactile signal in accordance with the header information from the demultiplexer 73 and outputs the tactile signal to the vibration unit 31.

<Operation Example of Reception Apparatus>

Figure 9:
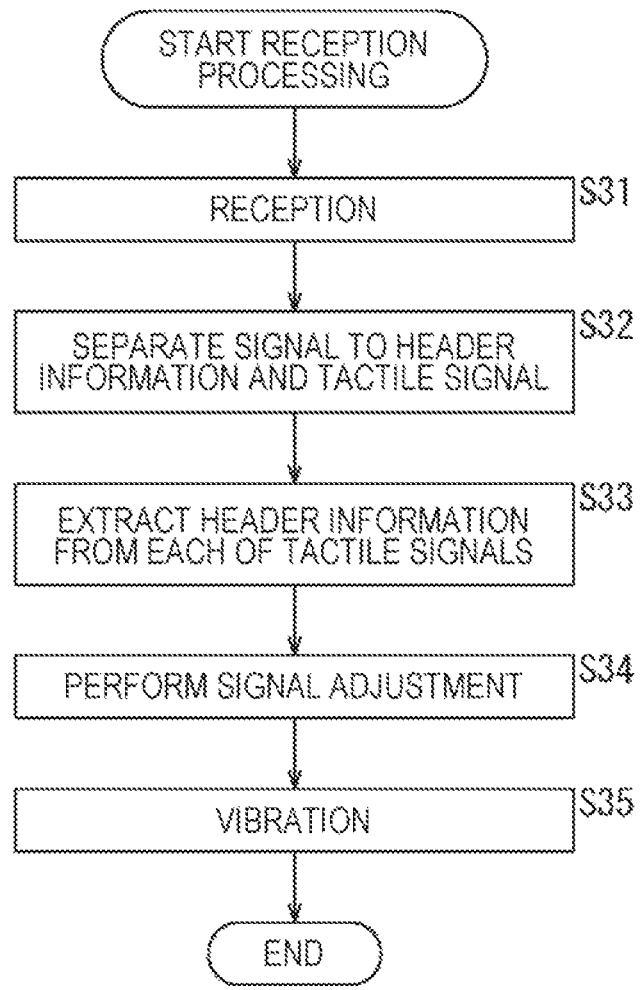
FIG. 9 is a flowchart illustrating reception processing of a wearable reception apparatus.

Next, reception processing of the wearable reception apparatus 12 will be described with reference to the flowchart of FIG. 9.

In step S31, the reception unit 71 receives a radio signal via the antenna 41, and outputs the received radio signal to the separation unit 72.

In step S32, the separation unit 72 separates the header and the tactile signal from the signal output from the reception unit 71, outputs the separated header to the demultiplexer 73, and outputs the separated tactile signal to each of the signal adjustment units 74-1 to 74-n.

In step S33, the demultiplexer 73 extracts the header information of each of tactile signals corresponding to 1 to n from the header, and outputs the extracted information to each of the signal adjustment units 74-1 to 74-$n$ of the corresponding number.

In step S34, the signal adjustment units 74-1 to 74-$n$ perform signal adjustment such as mute, delay, gain, or the like, on the basis of the corresponding header information from the demultiplexer 73, and output the tactile signals subjected to individual adjustments to the vibration units 31-1 to 31-$n$ of corresponding numbers.

In step S35, the vibration units 31-1 to 31-$n$ vibrate on the basis of a tactile signal.

<Example of Time-Division Multiplexing Operation>

Figure 10:
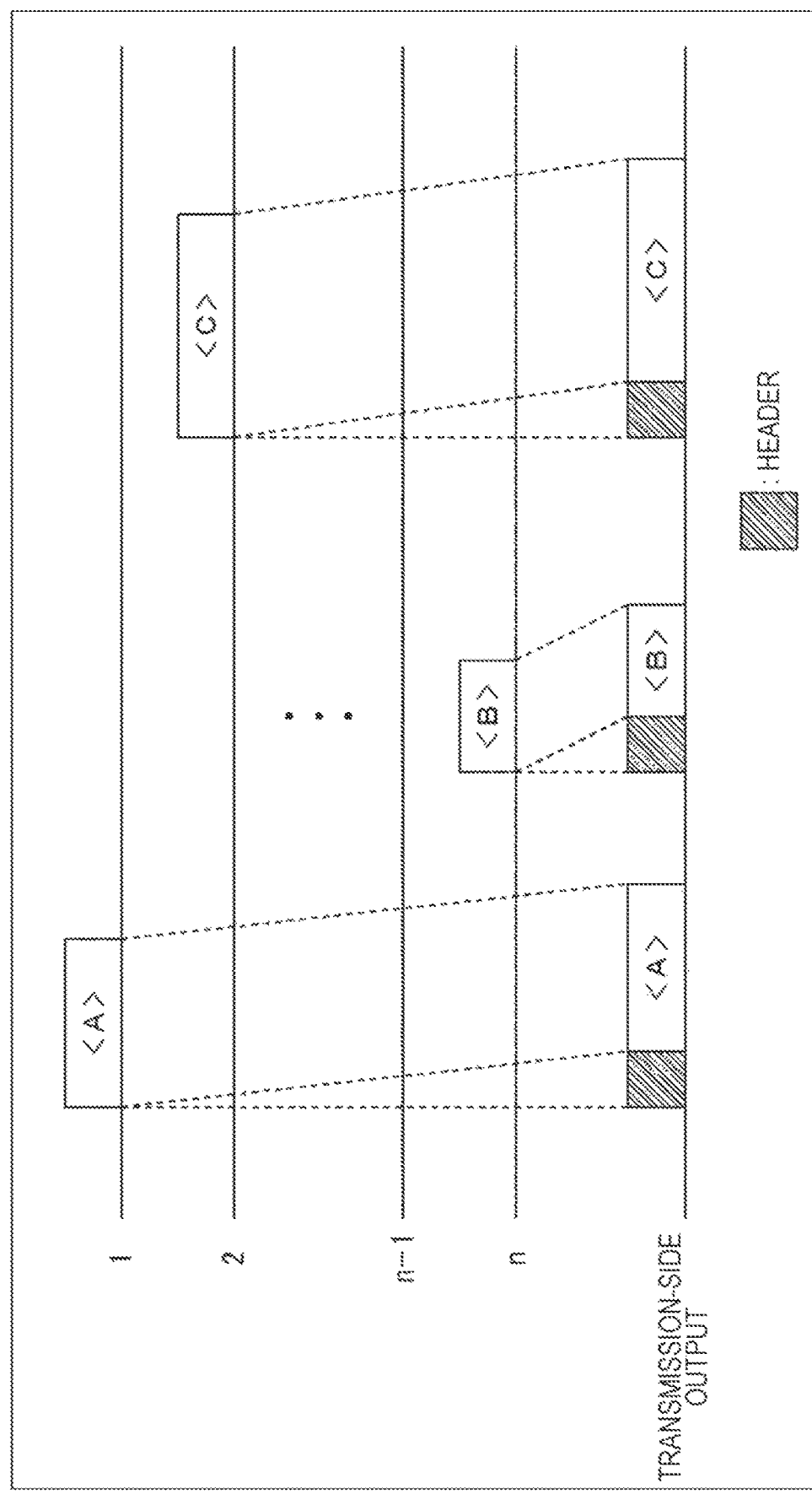
FIG. 10 is a diagram illustrating an example of a time-division multiplexing operation on a transmission side.

FIG. 10 is a diagram illustrating an example of time-division multiplexing operation of a tactile signal <A>, a tactile signal <B>, and a tactile signal <C> on the transmission side. A header is added for each of the tactile signals.

The tactile signal <A> input to Number 1 has a delay time corresponding to the header added and header information from the header generation unit 53 inserted before the tactile signal <A>. Similarly, the tactile signal <B> input to Number n and the tactile signal <C> input to Number 2 have delay time corresponding to the header added and corresponding header information inserted before the tactile signal <B> and the tactile signal <C>, individually.

Figure 11:
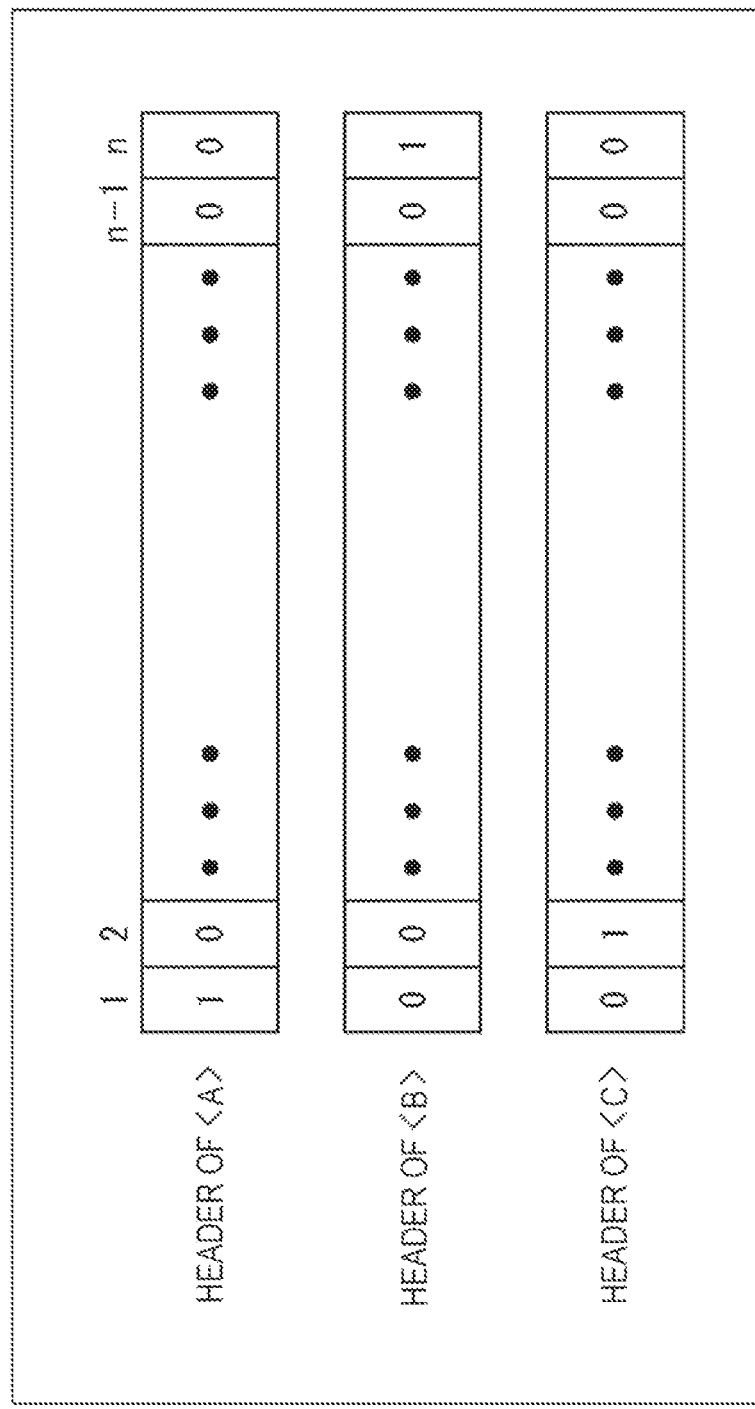
FIG. 11 is a diagram illustrating an example of header information.

Each of header information at this time is illustrated in FIG. 11. In the example of FIG. 11, the bit of the corresponding number is set to "1" in each of the header information of the tactile signal <A>, the header information of the tactile signal <B>, and the header information of the tactile signal <C>.

As described above, the example of FIG. 10 has described an example in which different tactile signals are transmitted without mutual overlap in time. Here, the present tactile presentation system 1 has a case where the tactile signal <a> is simultaneously used by the vibration units 31, that is, a plurality of tactile presentation devices. This case can be managed by simultaneously setting a plurality of bits of the header information to "1".

While there are cases where a plurality of tactile signals <a> is simultaneously used in the wearable reception apparatus 12, a presentation method of shifting the tactile presentation location (body part) is also applicable and thus, the tactile signal <a> is shifted in time to be used on the vibration units 31, in some cases. Note that it is presumed that the time shift is shorter than the duration of the tactile signal <a>. In such a case, it would not be efficient to transmit the tactile signal <a> with a plurality of Chs at a desired time shift, and thus, the time shift is to be managed by modifying the header information.

Figure 12:
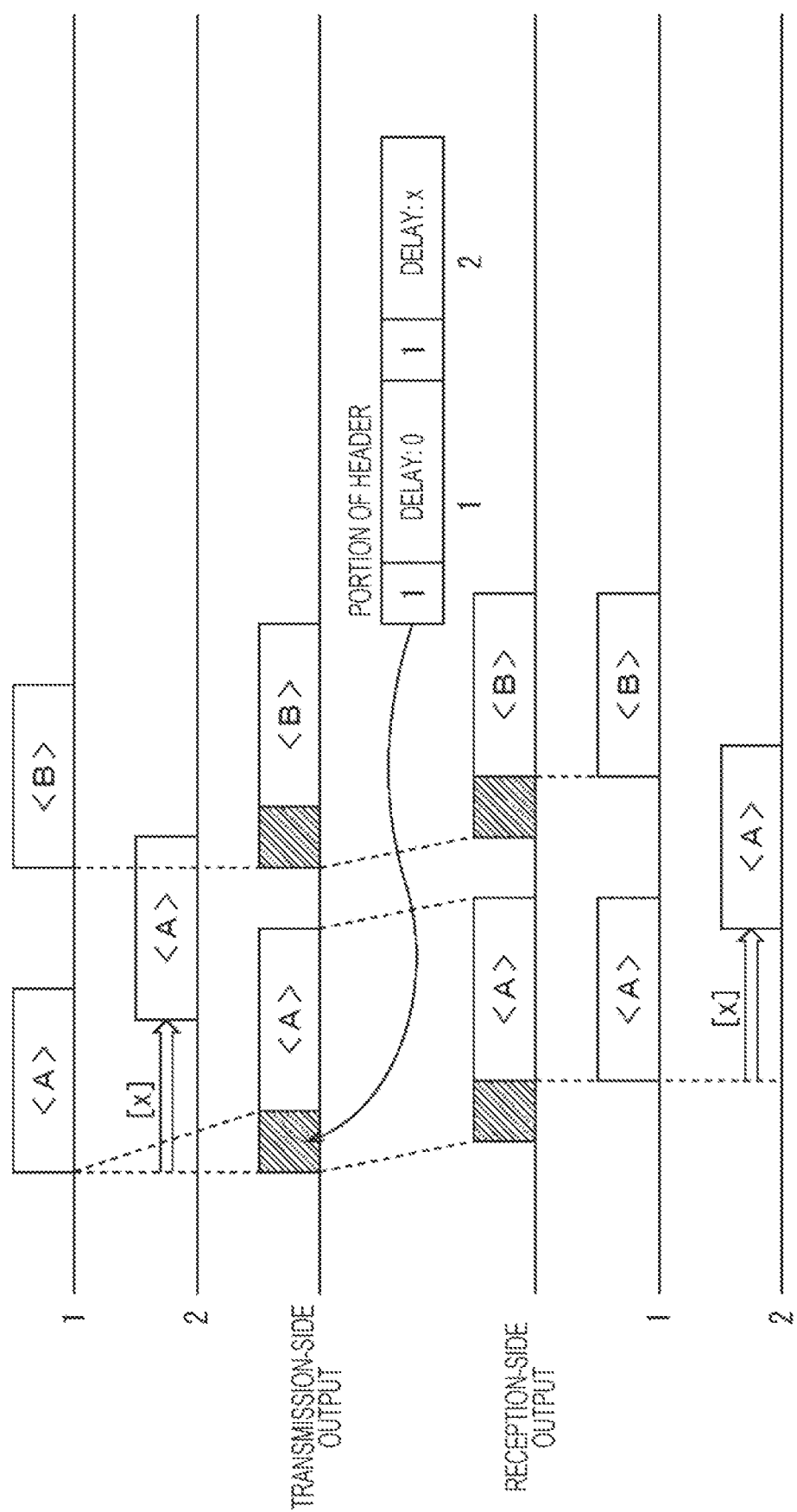
FIG. 12 is a diagram illustrating an example of time-division multiplexing operation in which time shift management has been performed.

FIG. 12 is a diagram illustrating an example of time-division multiplexing operation in which time shift management has been performed.

In contrast to Number 1, tactile signal <A> of Number 2 is shifted by delay [x]. On the transmission side, the tactile signal <A> is transmitted just at the timing for Number 1. The header information at that time also includes information associated with the tactile signal <A> of number 2 already recognized under the same environment, with a bit indicating "tactile signal is present" set. The header information in this state is transmitted including information shifted by delay [x] in association with the bit. For example, as illustrated in a portion of the header of FIG. 12, header information of the tactile signal <A> has description of bit "1" and delay "0" for Number 1 with description of bit "1" and delay "x" for Number 2.

With this configuration, the reception side receives one tactile signal <A> alone, thereby enabling the vibration unit 31 for Number 1 and Number 2 to be driven with time shifted.

Furthermore, even when Number 1 continues to be driven with the tactile signal <B> and even when the driving timing overlaps with the tactile signal <A> corresponding to Number 2, the driving can be managed with one Ch alone as a transmission channel, since the tactile signal <A> corresponding to Number 2 has already been transmitted.

Note that while the example illustrated in FIG. 12 is a case where the identical tactile signal drives the vibration unit 31 with time shift, the wearable reception apparatus 12 would also have a case where the tactile signal <a> is further utilized by a plurality of vibration units 31 with various presentation intensities (vibration amplitude). In that case, information associated with the relative presentation intensity would be added to the header information.

Figure 13:
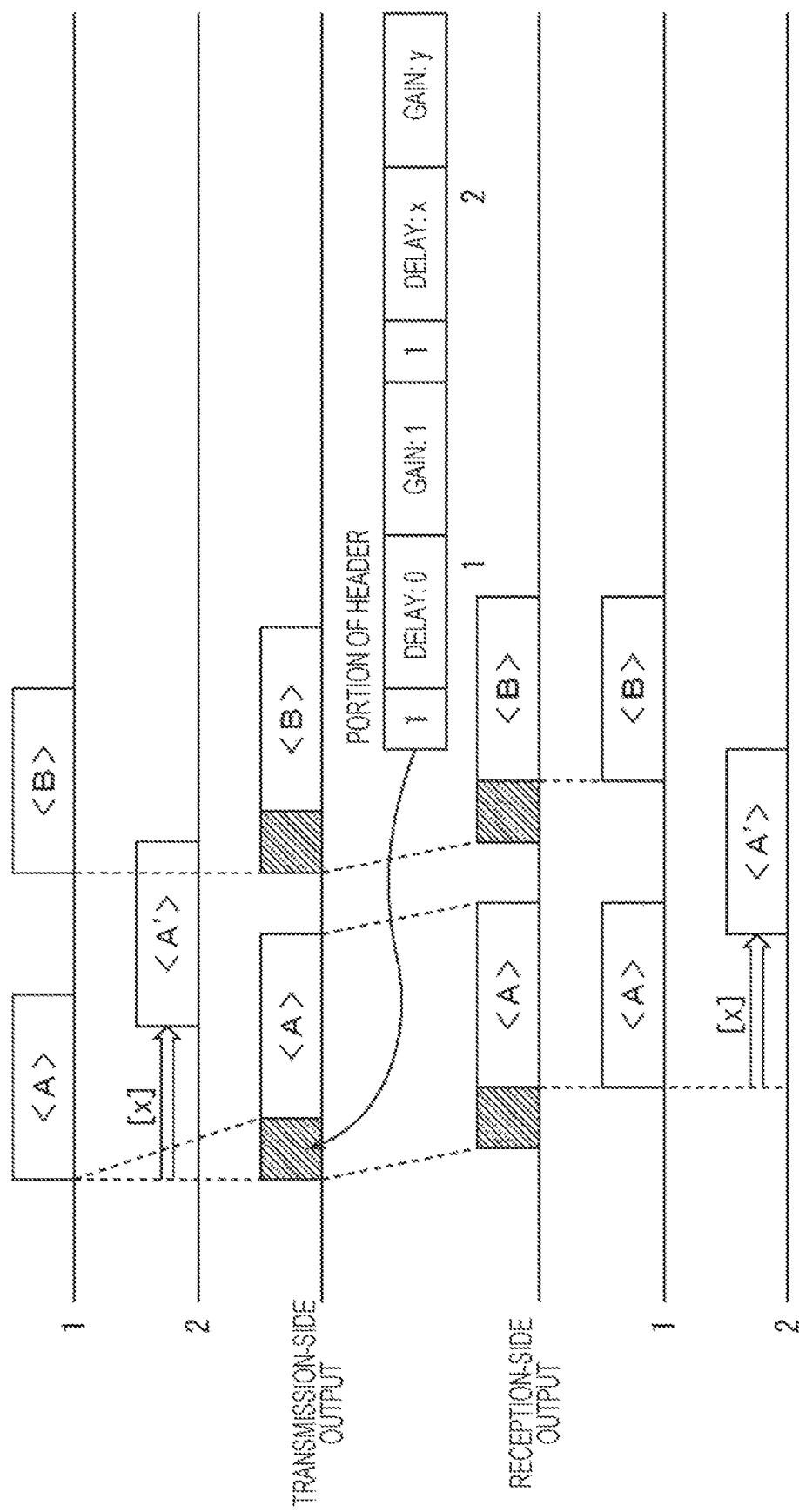
FIG. 13 is a diagram illustrating an example of time-division multiplexing operation in which gain (amplitude) management has been performed.

FIG. 13 is a diagram illustrating an example of time-division multiplexing operation in which gain (amplitude) management has been performed.

Tactile signal <A> is assigned to Number 1 and tactile signal <A'> (tactile signal being tactile signal <A> with different gain) is assigned to Number 2. Note that the tactile signal <A'> is a tactile signal being the same signal as the tactile signal <A>, with difference in gain alone. In addition, tactile signal <A'> of Number 2 is shifted by delay [x]. At this time, the ratio of the tactile signal of Number 2 to the signal of Number 1 is provided as gain [y] in the header information, with reference to Number 1 side.

For example, as illustrated in a portion of the header of FIG. 13, header information of the tactile signal <A> has description of bit "1", delay "0" and gain "1" for Number 1 with description of bit "1", delay "x", and gain "y" for Number 2.

With this configuration, the reception side receives one tactile signal <A> alone, thereby enabling the vibration unit 31 of Number 1 to be driven and enabling the vibration unit 31 of Number 2 to be driven with time shifted and with varied gain.

In this case also, even when Number 1 continues to be driven with the tactile signal <B> and even when the driving timing overlaps with the tactile signal <A'> corresponding to Number 2, the driving can be managed with one Ch alone as a transmission channel since the tactile signal <A'> corresponding to Number 2 has already been transmitted.

Note that there is no need to define the header information on the basis of Number 1 located at the head, in both delay and gain. Furthermore, "0" need not be included in the delay of the header information, and "1" need not be included in the gain. Still, for example, in order to eliminate the need to provide an extra delay circuit and eliminate the need for an extra signal amplitude dynamic range, namely, from the viewpoint of actual implementation, it would be desirable to set to "Delay: 0" and "Gain: 1".

The above has described an example in which the tactile signals are transmitted without mutual overlap in time in the transmission-side output stage as well. That is, the radio transmission system is capable of transmitting a tactile signal simply by using one frequency Ch alone.

As opposed to this, the present tactile presentation system 1 also has a case where another tactile signal may be transmitted while one tactile signal is being transmitted even though timings of transmission of the tactile signals are not the same. This case would not be manageable by one frequency Ch, and thus, it is necessary to use a plurality of frequency Chs. It is, however, still possible to reduce the frequency Chs to use by performing time-division multiplexing on the tactile signal without providing the same number of frequency Chs as the plurality of vibration units 31.

Figure 14:
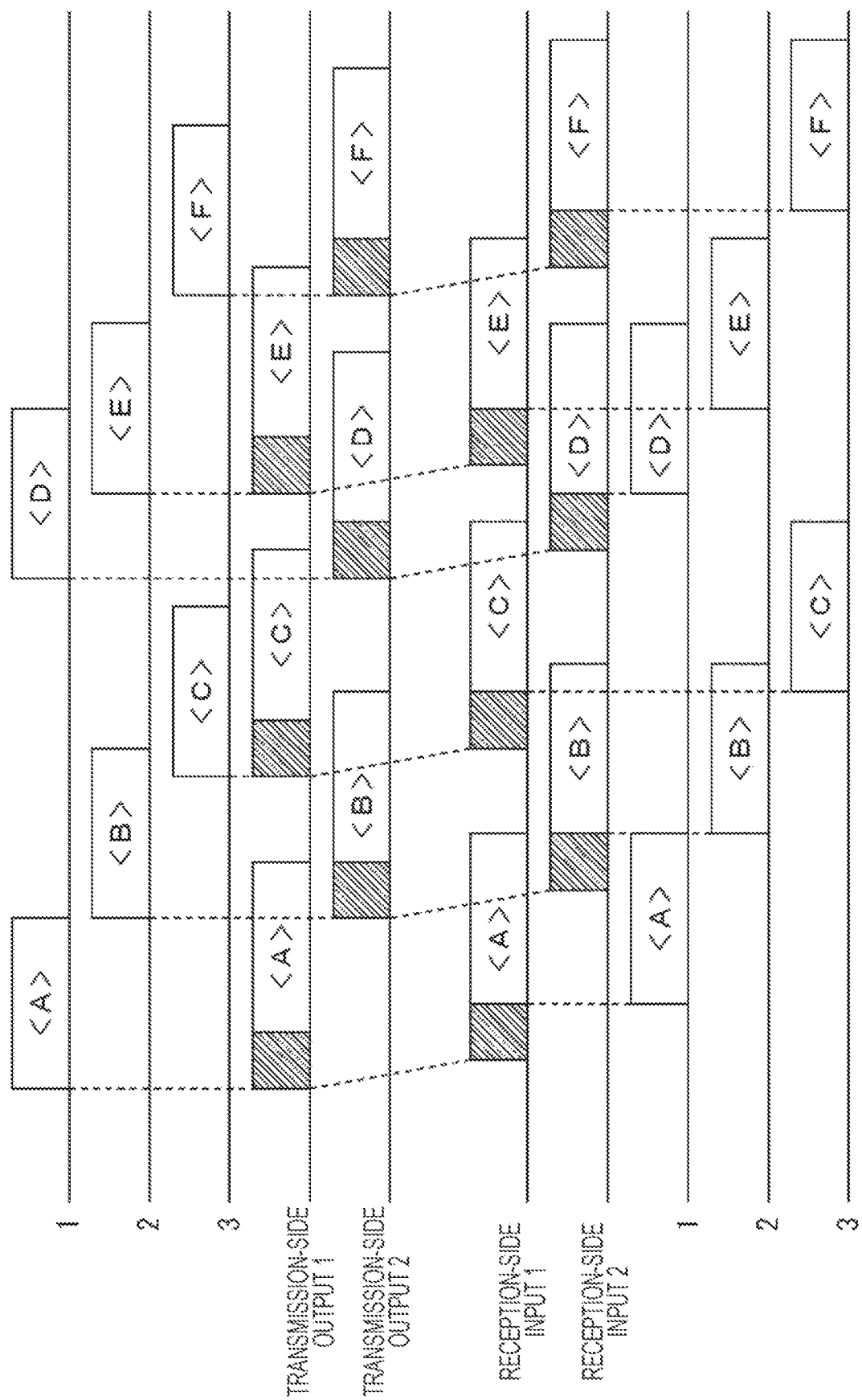
FIG. 14 is a diagram illustrating an example of time-division multiplexing operation using a plurality of channels (Chs).

FIG. 14 is a diagram illustrating an example of a time-division multiplexing operation using a plurality of Chs.

Tactile signals <A> to <F> are transmitted from Numbers 1, 2, and 3. Specifically, <A> and <D> are transmitted from Number 1, <B> and <E> from Number 2, and <C> and <F> from Number 3. As illustrated in FIG. 14, overlapping of tactile signals occurs in each of tactile signals <A> and <B>, tactile signals <B> and <C>, and tactile signals <D> and <E>. However, there is no simultaneous overlapping of three tactile signals, and thus, frequency Ch to be used can be managed by two Chs.

Note that, strictly speaking, each of the tactile signals <B>, <D> and <F> does not overlap with the previous tactile signal. Still, the signal is transmitted using another frequency Ch because of an occurrence of overlap due to insertion of the header.

Accordingly, the tactile signal <A> is transmitted as transmission-side output 1, the tactile signal <B> is transmitted as transmission-side output 2 since it overlaps with the tactile signal <A>, and the tactile signal <C> is transmitted as the transmission-side output 1 since it overlaps with the tactile signal <B>. Similarly, the tactile signal <D> is transmitted as the transmission-side output 2 since its header portion overlaps with the tactile signal <C>, and the tactile signal <E> is transmitted as the transmission-side output 1 since it overlaps with the tactile signal <D>, and the tactile signal <F> is transmitted as the transmission-side output 2 since its header portion overlaps with the tactile signal <E>.

With this operation, on the wearable reception apparatus 12, the tactile signals <A>, <C> and <E> are received as reception-side input 1, and the tactile signals <B>, <D>, and <F> are received as reception-side input 2, and the vibration unit 31 vibrates such that <A> and <D> vibrates as Number 1, <B> and <E> as Number 2, and <C> and <F> as Number 3.

<Parameter Design>

Note that an example of the requirement for the header in the tactile presentation system will be described.

An exemplary item to be affected by header insertion is delay in processing of tactile signal. Zero delay would be desirable in the tactile presentation system, still, here, the delay amount on a radio channel is set to 10 ms at maximum. Accordingly, assuming that the processing delay other than header insertion is 2 ms, the header length itself is assumed to be ensured up to 8 ms. The amount of information transmittable within 8 ms changes depending on the setting of the transmission rate of the header information. Considering that the frequency required for the radio channel also becomes wider with the increase in the transmission rate, the transmission rate is to be set to a rate that would achieve a frequency band approximately equal to the assumed tactile signal, with the frequency to be used here defined as 20 kHz.

Meanwhile, header information for each of tactile signals is assumed to include three types of information, namely, presence or absence of tactile signal (on/off of mute), delay amount, and gain. Presence or absence of a tactile signal is represented by one bit. Delay amount is represented by four bits, in 16 gradations. Gain is represented by three bits, in eight gradations, including amplification and attenuation. In total, one tactile signal is configured with eight bits.

From these settings, when the transmission rate is 20 kbps at 20 kHz, the amount of information that can be transmitted in 8 ms would be calculated as 160 bits (=20 k 8 m). This means it is possible to embed 20 pieces (=160 bits/8 bits) of tactile signal information as header information. That is, 20 types of tactile signals can be time-division multiplexed on one radio transmission channel.

In a case where the tactile presentation system 1 handles more types of tactile signals or handles a larger amount of header information (for example, arithmetically computing a plurality of tactile signals on the reception side, or the like), there would be a need to transmit data of 160 bits or more. It is, however, not possible to increase the delay time by inserting the header, and it is also undesirable to set the operating frequency to be high. In such a case, although the assumption used above is "transmission rate of 20 kbps at 20 kHz", it is still possible to manage with a method of increasing the amount of information per 1 Hz by multi-leveling the signal. In other words, transmission rates of 40 kbps and 60 kbps can be used at 20 kHz by multi-leveling the signal.

As described above, according to the present technology, information indicating whether or not a tactile signal is to be used for each of vibration units as information associated with the vibration unit that uses a tactile signal, delay information, and gain information are described in the header, and the tactile signal is time-division multiplexed. This makes it possible to transmit signals with less frequency chs.

Note that it is also allowable to incorporate reproduction speed, pitch, the number of times of repeat (for storing and repeatedly using tactile signals) in the header.

Furthermore, it is allowable to provide the wearer-side reception apparatus 12 with a function capable of storing a tactile signal. In this case, when it is desired to simultaneously reproduce tactile signals of the plurality of Chs of the system, it is possible to preliminarily transmit and store a tactile signal, and header information can be used to simultaneously (or within a predetermined time difference) reproduce the received tactile signal and the stored tactile signal to enable simultaneous reproduction of the tactile signals of the plurality of Chs.

Note that the header configuration at time-division multiplexing and transmission of the tactile signal is not limited to the above-described header configuration. Next, another header configuration will be described.

2. Second Embodiment

<Outline of Technology>

A technology of presenting a desired tactile sensation to a certain point of an area surrounded by the three vibration units 31*a* to 31*c* (actuators) is a psychophysical phenomenon referred as "phantom sensation", which is a phenomenon of perceiving a stimulation in a portion between two points that have been simultaneously stimulated. This perceptual phenomenon indicates that it is difficult to fix a virtual stimulus point and it is easy to induce illusion by moving portions between the two points.

Although not limited to the technology described above, the tactile signal is considered to include a tactile waveform wished to be presented at an arbitrary point, not being limited to the waveform that drives each of the vibration units 31, as typified by the above-described technology.

Here, there are following three methods in transmitting the tactile signal that provides a desired tactile presentation to a certain point of an area surrounded by the three vibration units 31a to 31c by using the above-described multiplexing method, and a header configuration of each of the three methods will be described.

Method (1) is a method of transmitting information of specific three vibration units 31 surrounding an area.

Method (2) is a method of transmitting information of all the vibration units 31 so as to enable identical tactile presentation in a plurality of areas.

Method (3) is a method of transmitting the route information to be presented and quoting amplitude gain corresponding to the route from a reception-side table part.

Figure 15:
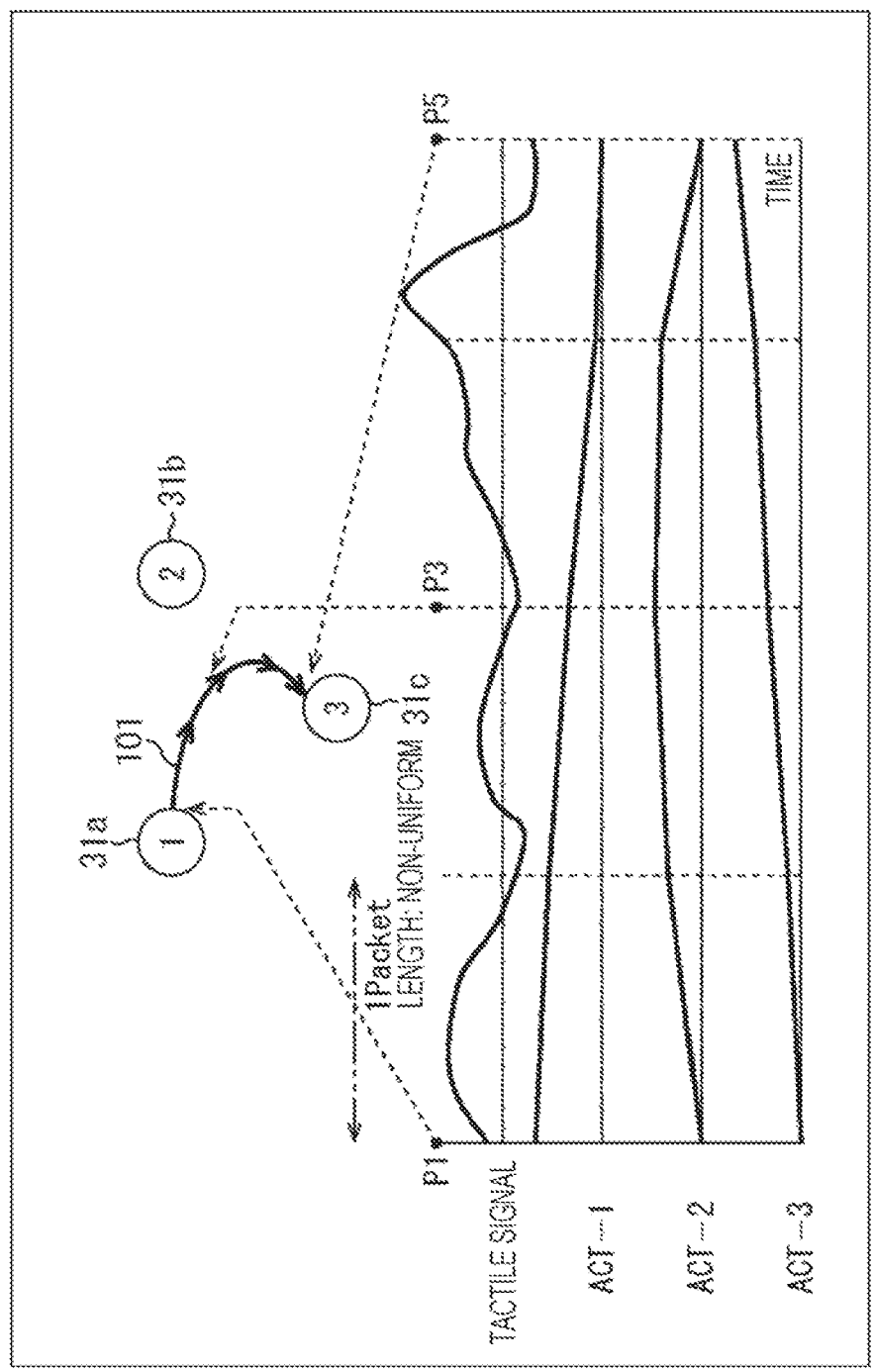
FIG. 15 is a diagram illustrating another transmission method (1).

FIG. 15 is a diagram illustrating Method (1). As described above, Method (1) is a method of transmitting information of the specific three vibration units 31a to 31c. That is, header information is generated for each of the three vibration units 31 and transmitted.

In the case of the example of FIG. 15, the header information needs to include actuator (ACT) number, an Amp gain initial value and the slope for a group surrounding the area. That is, the header includes an ACT number identifying individual vibration unit as information associated with the vibration unit that uses the tactile signal.

The example of FIG. 15 includes illustrations of the positional relationship between the vibration unit 31a to the vibration unit 31c, and a trajectory 101 of vibration (sensation of movement of vibration). Below these are illustrated from the upper side: a waveform of the tactile signal wished to be presented transmitted from the transmission side; ACT numbers ACT-1 to ACT-3 corresponding to the vibration units 31a to 31c to invoke vibration as illustrated by the trajectory 101; and individual Amp gain curves plotted with their Amp gain initial values and the slopes.

In addition, in the example of FIG. 15, the dotted line represents one packet, and its length is non-uniform. As illustrated in the trajectory 101, the vibration position is in the vibration unit 31a at the head (P1) of the first packet, it is in a substantially central position of the vibration unit 31a to the vibration unit 31c at the head (P3) of the third packet, and it is in the vibration unit 31c at the head (P5) of the fifth packet.

The tactile signal indicated in the waveform can vibrate the vibration unit 31a to the vibration unit 31c following the three Amp gain curves of ACT-1 to ACT-3. The vibration is performed by the vibration unit 31a to the vibration unit 31c (three actuators) as illustrated in the trajectory 101 Specifically, P1 corresponds to a position where the Amp gain curve of ACT-1 is at 1 and the gain curves of ACT-2 and ACT-3 are at 0, and thus, vibration is performed in the vibration unit 31a. P3 corresponds to a position where gain curves of ACT-1 to ACT-3 are at about 0.5, and thus, vibration is performed in an approximate center position of the vibration unit 31a to the vibration unit 31c. P5 corresponds to a position where the Amp gain curve of ACT-3 is at 1, and the gain curves of ACT-1 and ACT-2 are at 0, and thus, vibration is performed in the vibration unit 31c.

Note that the movement of the certain point (position of vibration) might cross areas, the group surrounding the area included in the header information may have variable length, namely, four or five, even though the number has been described as three in the above.

In addition, the gain is in the range of 0 to 1. When the gain exceeds the range, clipping is performed by slope calculation.

Figure 16:
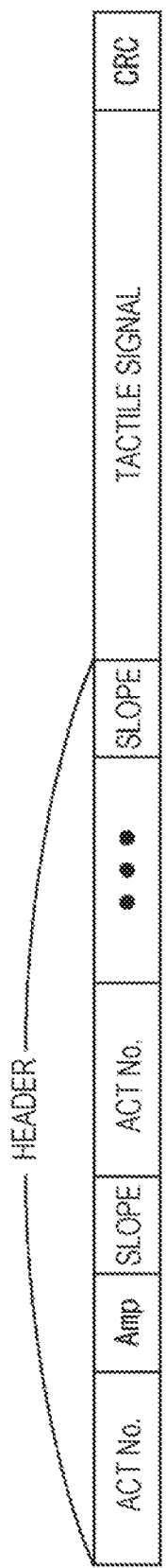
FIG. 16 is a diagram illustrating a packet configuration example according to the transmission method (1) in FIG. 15.

FIG. 16 is a diagram illustrating a packet configuration example in the case of Method (1) of FIG. 15.

In the example of FIG. 16, the packet is formed with a header, a tactile signal, and a CRC. The header includes ACT number, the Amp gain initial value (Amp), and the slope, as many as the number of the vibration units 31 belonging to the group surrounding the area. Note that, here, a plurality of Amp may be embedded instead of slope.

Figure 17:
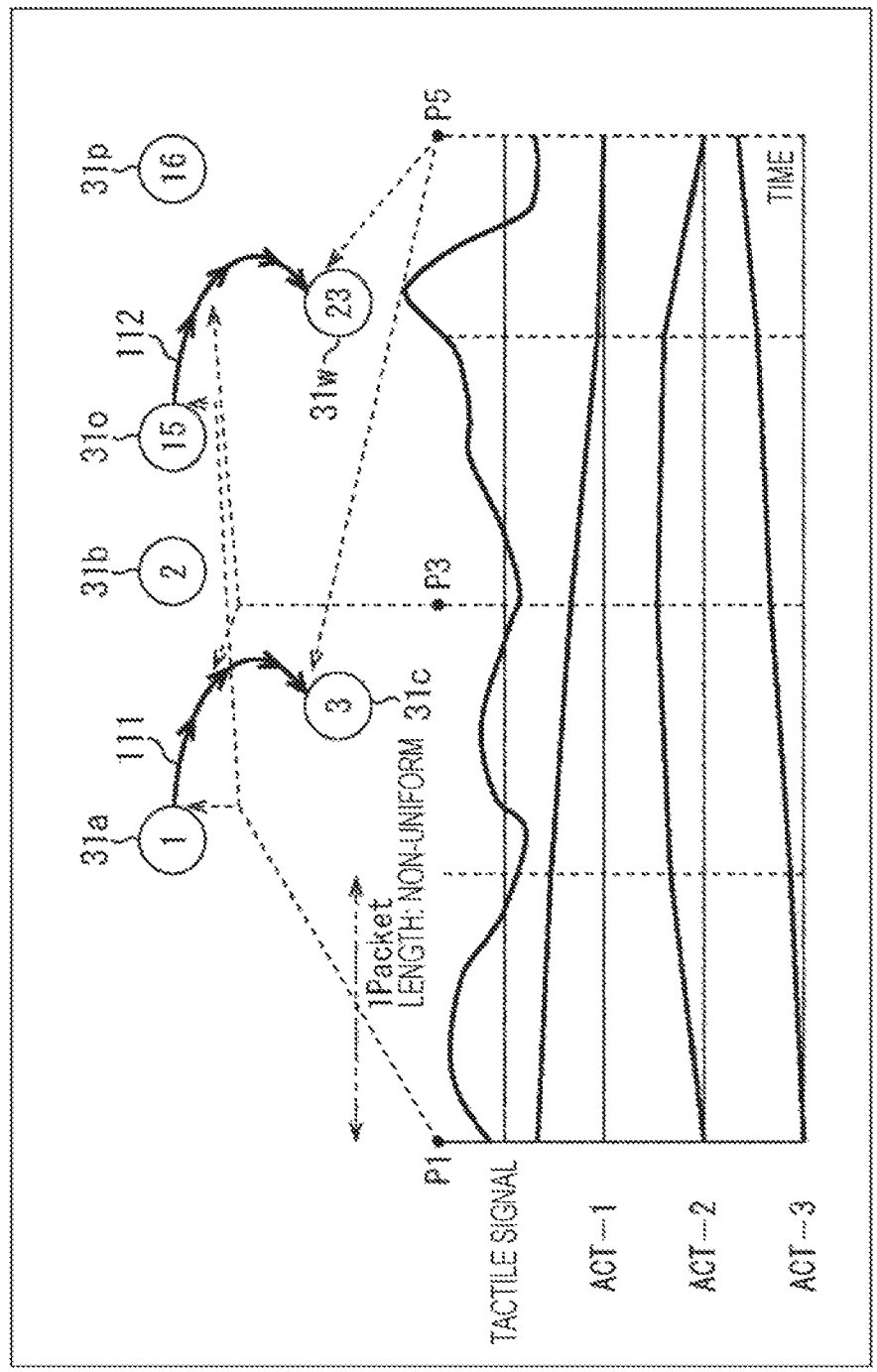
FIG. 17 is a diagram illustrating another transmission method (2).

FIG. 17 is a diagram illustrating Method (2). The method (2) is a method of transmitting information of all the vibration units 31 to the header of one tactile signal so as to enable the identical tactile presentation in a plurality of areas. That is, the header information of each of the vibration units 31 can be freely set regardless of the header information of the other vibration unit 31.

In the case of the example of FIG. 17, the header information for each of the vibration unit 31 needs to include the presence or absence of the use of the tactile signal, and the Amp gain initial value and the slope for the vibration unit 31 that uses the tactile signal. That is, the header includes information indicating whether or not to use the tactile signal for each of the vibration units and the Amp gain initial value and the slope for the corresponding vibration unit regardless of the necessity (use) of the tactile signal, as information associated with the vibration unit that uses the tactile signal.

The example of FIG. 17 includes illustrations of the positional relationship between the vibration unit 31a to the vibration unit 31c, a vibration unit 31o, a vibration unit 31p, and a vibration unit 31w, and trajectories 111 and 112 of vibration (sensation of movement of vibration). Below these are illustrated from the upper side: a waveform of the tactile signal wished to be presented transmitted from the transmission side; ACT numbers ACT-1 to ACT-3 corresponding to the vibration units 31a to 31c to invoke vibration as illustrated by the trajectory 111; and individual Amp gain curves plotted with their Amp gain initial values and slopes. Although not illustrated, ACT number ACT-15, ACT-16, and ACT-23 corresponding to the vibration unit 31o, the vibration unit 31p, and the vibration unit 31w to invoke vibration as illustrated by the trajectory 112 and individual Amp gain curves plotted with their Amp gain initial values and slope have substantially same behavior, and thus, they are basically similar to that corresponding to the vibration units 31a to 31c.

In addition, in the example of FIG. 17, the dotted line represents one packet, and its length is non-uniform. As illustrated in the trajectory 111, the vibration position is in the vibration unit 31a at the head (P1) of the first packet, it is in a substantially central position of the vibration unit 31a to the vibration unit 31c at the head (P3) of the third packet, and it is in the vibration unit 31c at the head (P5) of the fifth packet. In addition, as illustrated in the trajectory 112, the vibration position is in the vibration unit 31o at the head (P1) of the first packet, it is in a substantially central position of the vibration unit 31o, the vibration unit 31p, and the vibration unit 31w at the head (P3) of the third packet, and it is in the vibration unit 31w at the head (P5) of the fifth packet.

The tactile signal indicated in the waveform can vibrate the vibration unit 31a to the vibration unit 31c following the Amp gain curves of ACT-1 to ACT-3. That is, the vibration is performed by the vibration unit 31a to the vibration unit 31c as illustrated in the trajectory 111. Similarly, although not illustrated, the tactile signal illustrated in the waveform can vibrate the vibration unit 31o, the vibration unit 31p, and the vibration unit 31w following the Amp gain curves of ACT-15, ACT-16, and ACT-23. That is, the vibration is performed by the vibration unit 31o, the vibration unit 31p, and the vibration unit 31w as illustrated in the trajectory 112.

Figure 18:
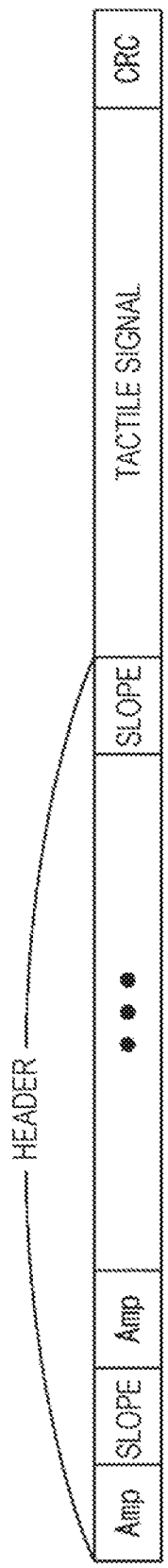
FIG. 18 is a diagram illustrating a packet configuration example according to the transmission method (2) in FIG. 17.

FIG. 18 is a diagram illustrating a packet configuration example in the case of Method (2) of FIG. 17.

In the example of FIG. 18, the packet is formed with a header, a tactile signal, and a CRC. The header includes Amp gain initial value (Amp) and the slope, as many as the number of actuators (vibration units 31). For example, when the tactile signal is not used, Amp and slope are set to 0. In other words, when both are 0, the header is information indicating that the tactile signal is not used for each of vibration units, and when either one is not 0, it is information indicating the use of the tactile signal for each of the vibration units.

Figure 19:
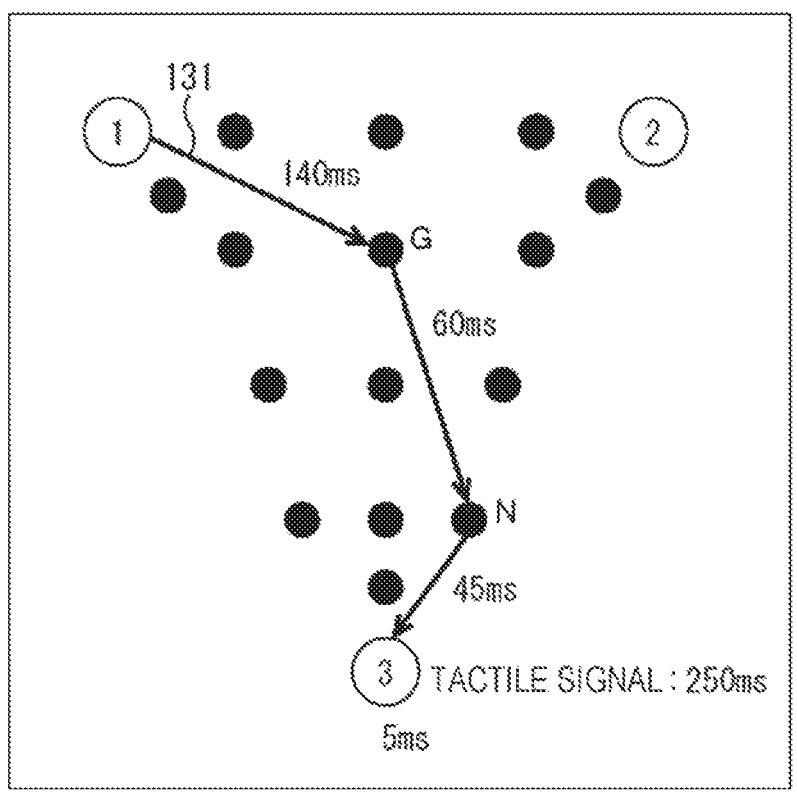
FIG. 19 is a diagram illustrating another transmission method (3).

FIG. 19 is a diagram illustrating Method (3). As described above, Method (3) is a method of transmitting route information for performing "tactile presentation" and quoting amplitude gain corresponding to the route from the reception-side table.

In the example of FIG. 19, header information needs to include actuator (ACT), group number (Gp), presentation point (position), and time. That is, the header includes an ACT Gp identifying individual vibration units as information associated with the vibration unit that uses the tactile signal. On the reception side, it is possible to grasp which vibration unit 31 is configured in this ACT GP.

The example of FIG. 19 illustrates the positional relationship between the vibration unit 31a and the vibration unit 31c and a trajectory 131 of the vibrations (sensation of movement of vibration).

First, in the case of the example of FIG. 19, changes in the Amp gains 1, 2, and 3, specifically from 1 to G, from G to N, and from N to 3, are obtained with reference to the reception-side table. ACT GP includes "1 (vibration unit 31a), 2 (vibration unit 31b), 3 (vibration unit 31 c)", and the like. The presentation points include a "portion from 1 to G", "portion from G to N", "a portion from N to 3", and the like. The time includes "140 ms", "60 ms", "45 ms", and the like. Note that, as a presentation point, "portion from 3 to 3" would also be possible.

Figure 20:
FIG. 20 is a diagram illustrating a packet configuration example according to the transmission method (3) in FIG. 19.

FIG. 20 is a diagram illustrating a packet configuration example in the case of Method 3 of FIG. 19.

In the example of FIG. 20, the packet is formed with a header, a tactile signal, and a CRC. The header includes ACT GP (Gp), presentation point (Pt), and time.

Note that while the examples illustrated in FIGS. 16, 18, and 20 illustrate the lengths of the headers in an equal length, actual lengths are different from each other.

Figure 21:
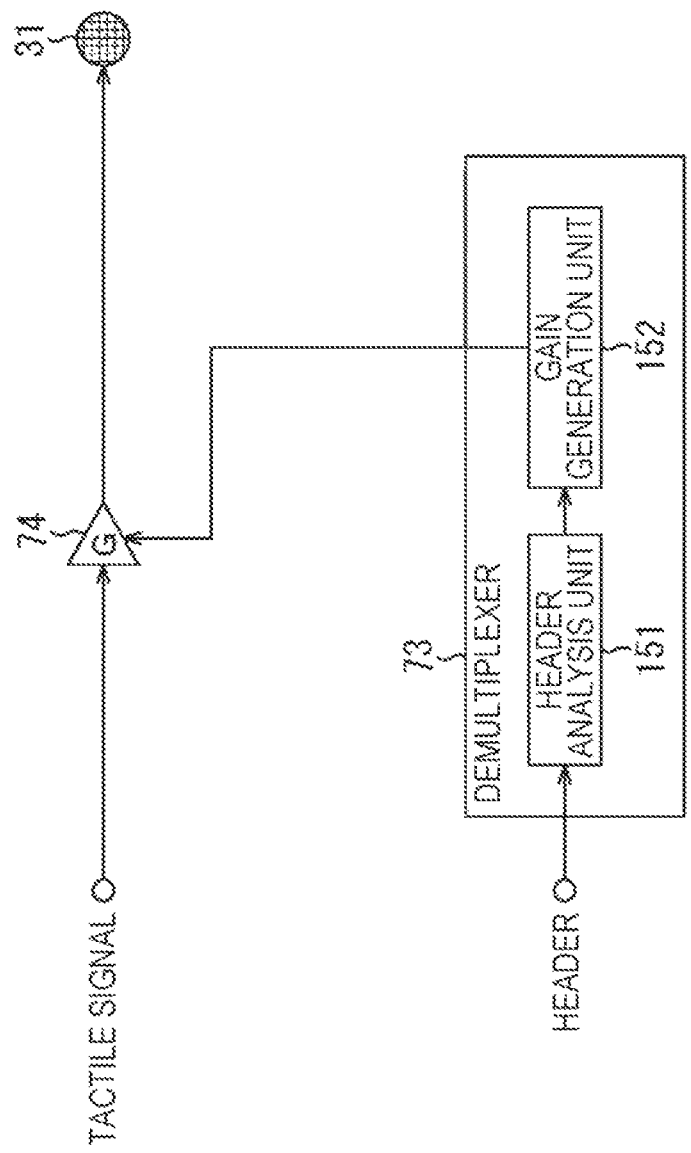
FIG. 21 is a diagram illustrating a configuration example of a demultiplexer and a signal adjustment unit of a wearable reception apparatus in a case of another transmission method.

FIG. 21 is a diagram illustrating a configuration example of a demultiplexer and a signal adjustment unit of a wearable reception apparatus in a case of Methods (1) to (3).

In the example of FIG. 21, the demultiplexer 73 includes a header analysis unit 151 and a gain generation unit 152.

As described above with reference to FIGS. 15, 17, and 19, the header analysis unit 151 analyzes the header and instructs the gain generation unit 152 as to which vibration unit 31 is to apply gain on the signal to what degree. In the case of FIGS. 15 and 17, the gain generation unit 152 generates the gain on the basis of analysis by the header analysis unit 151, and outputs the generated gain to the signal adjustment unit 74. Note that the gain value also varies in one packet (header). Furthermore, the gain generation unit 152 in FIG. 19 includes a gain table, and generates a gain with reference to the gain table on the basis of the analysis by the header analysis unit 151, and then, outputs the generated gain to the signal adjustment unit 74.

The signal adjustment unit 74 performs gain processing in accordance with the gain generated by the gain generation unit 152, and outputs the processed signal to the vibration unit 31. Note that, although the mute function is omitted, it is possible to manage with the setting of gain="0".

According to the present technology, information indicating whether or not a tactile signal is to be used for each of vibration units as information associated with the vibration unit that uses a tactile signal is described in the header, and the tactile signal is time-division multiplexed. This makes it possible to transmit signals with a small number of frequency chs.

In particular, Method 1 uses same signals for the tactile signal and for the signal waveform for driving surrounding three (plurality of) actuators, it is possible to compress the tactile signal to be transmitted to ⅓ (in the case of three actuators).

Furthermore, in Method 2, the header information of each of actuators can be freely set regardless of the header information of other actuators.

Furthermore, in the case of Method 3, it is possible to make settings in detail.

Note that, although the above description assumed the reception apparatus as a wearable apparatus, it is not limited to a wearable apparatus.

3. Third Embodiment

<Personal Computer>

A series of processing described above can be executed in hardware or with software. In a case where the series of processing is executed with software, a program included in the software is installed in a computer. Herein, the computer includes a computer incorporated in a dedicated hardware, a general-purpose personal computer on which various types of functions can be executed by installing various programs, and the like.

Figure 22:
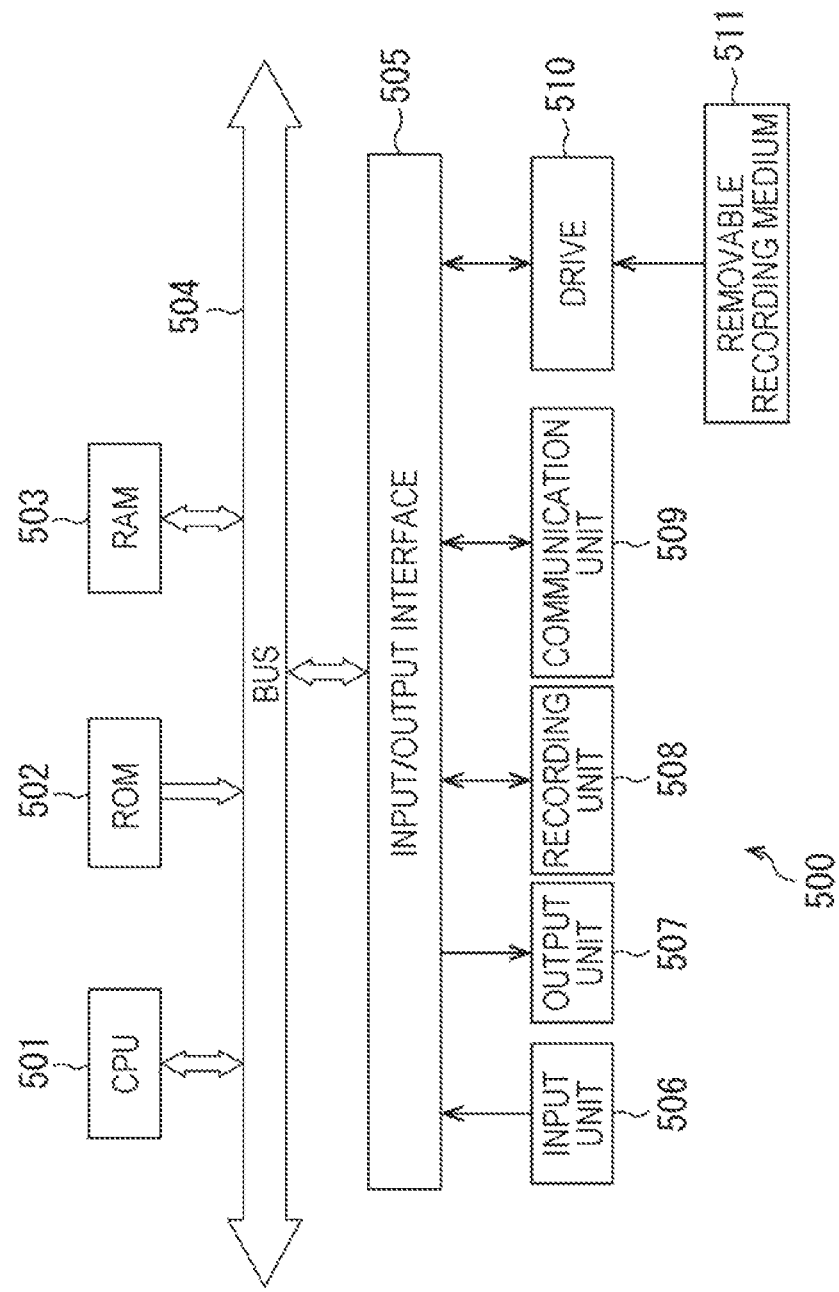
FIG. 22 is a block diagram illustrating an example of a personal computer.

FIG. 22 is a block diagram illustrating an exemplary configuration of hardware of a personal computer in which the series of processing described above is executed by a program.

In a personal computer 500, a central processing unit (CPU) 501, a read only memory (ROM) 502, and a random access memory (RAM) 503 are interconnected via a bus 504.

The bus 504 is further connected with an input/output interface 505. The input/output interface 505 is connected with an input unit 506, an output unit 507, a storage unit 508, a communication unit 509, and a drive 510.

The input unit 506 includes a key board, a mouse, a microphone, and the like. The output unit 507 includes a display, a speaker, or the like. The storage unit 508 includes a hard disk, a non-volatile memory, and the like. The communication unit 509 includes a network interface and the like. The drive 510 drives a removable medium 511 including a magnetic disk, an optical disk, a magneto-optical disk, a semiconductor memory, or the like.

In the personal computer 500 configured as described above, for example, the CPU 501 loads the program stored in the storage unit 508 to the RAM 503 via the input/output interface 505 and the bus 504 and executes the program. With this configuration, the above-described series of processing is performed.

The program executed by the computer (CPU 501) can be recorded and provided in the removable medium 511. The removable medium 511 includes, for example, a package medium or the like such as a magnetic disk (including a flexible disk), an optical disk (including compact disc-read only memory (CD-ROM), a digital versatile disc (DVD) and the like), a magneto-optical disk, or a semiconductor memory. In addition, alternatively, the program can be provided via a wired or wireless transmission medium including a local area network, the Internet, and digital satellite broadcasting.

On a computer, a program can be installed in the storage unit 508 via the input/output interface 505, by attaching the removable medium 511 to the drive 510. In addition, the program can be received at the communication unit 509 via a wired or wireless transmission medium and be installed in the storage unit 508. Alternatively, the program can be installed in the ROM 502 or the storage unit 508 beforehand.

Note that the program executed by the computer may be a program processed in a time series in an order described in the present description, or can be a program processed in parallel, or in a necessary stage such as being called.

Further, in the present description, each of the steps describing the program recorded on the recording medium includes not only processing performed in time series along the described order, but also processing executed in parallel or separately, when it is not necessarily processed in time series.

Moreover, in the present description, a system represents an entire apparatus including a plurality of devices (apparatuses).

For example, the present disclosure can be configured as a form of cloud computing in which one function is shared in cooperation for processing among a plurality of apparatuses via a network.

Alternatively, a configuration described above as a single apparatus (or processing unit) may be divided and configured as a plurality of apparatuses (or processing units). Conversely, a configuration described above as a plurality of apparatuses (or processing units) may be integrated and configured as a single apparatus (or processing unit). In addition, configurations other than the above-described configurations may, of course, be added to the configurations of the apparatuses (or the processing units). Furthermore, as long as configurations or operation are substantially the same in the entire system, the configurations of certain apparatuses (or processing units) may be partially included in the configurations of the other apparatuses (or other processing units) Accordingly, the present technology are not limited to the above-described embodiments but can be modified in a variety of ways without departing from the scope of the present technology.

Hereinabove, the preferred embodiments of the present disclosure have been described in detail with reference to the accompanying drawings, while the present disclosure is not limited to the above examples. A person skilled in the art in the technical field of the present disclosure finds it understandable to reach various alterations and modifications within the technical scope of the appended claims, and it should be understood that they will naturally come within the technical scope of the present disclosure.

Note that the present technology may also be configured as follows.

(1) A reception apparatus including:
a vibration unit that performs vibration;
a reception unit that receives a time-division multiplexed signal obtained by performing time-division multiplexing on a signal obtained by adding a header including description of information associated with a vibration unit that uses a tactile signal including a waveform of vibration for vibrating the vibration unit, to the tactile signal;
a separation unit that separates the tactile signal and the header from the time-division multiplexed signal received by the reception unit; and
a signal adjustment unit that adjusts the tactile signal separated by the separation unit in accordance with the header separated by the separation unit,
in which the vibration unit performs vibration based on the tactile signal adjusted by the signal adjustment unit.

(2) The reception apparatus according to (1),
in which the information associated with the vibration unit that uses the tactile signal is information indicating whether or not the vibration unit is to use the tactile signal for each of the vibration units.

(3) The reception apparatus according to (2),
in which the signal adjustment unit performs processing of muting the tactile signal separated by the separation unit in a case where the header indicates that the vibration unit is not to use the tactile signal.

(4) The reception apparatus according to (2),
in which the header includes description of gain information and delay information for each of the vibration units.

(5) The reception apparatus according to (2),
in which the header includes description of a gain initial value and slope for each of the vibration units.

(6) The reception apparatus according to (1),
in which the information associated with the vibration unit that uses the tactile signal is information for identifying a plurality of vibration units that uses the tactile signal.

(7) The reception apparatus according to (6),
in which the header includes description of a gain initial value and slope for each of the plurality of vibration units.

(8) The reception apparatus according to (1),
in which the information associated with the vibration unit that uses the tactile signal is information for identifying a group including a plurality of vibration units that uses the tactile signal.

(9) The reception apparatus according to (8),
in which the header includes description of a position and time of vibration,
the reception apparatus further includes a gain calculation unit that analyzes a header separated by the separation unit and refers to a table so as to obtain a gain change between the vibration units belonging to the group, and
the signal adjustment unit adjusts the tactile signal separated by the separation unit in accordance with the header separated by the separation unit and the gain change calculated by the gain calculation unit.

(10) The reception apparatus according to any of (1) to (9),
the reception apparatus being formed as a wearable apparatus to be worn by a user.

(11) A reception method including executing, by a reception apparatus:
receiving a time-division multiplexed signal obtained by performing time-division multiplexing on a signal obtained by adding a header including description of information associated with a vibration unit that uses a tactile signal including a waveform of vibration for vibrating the vibration unit that performs vibration, to the tactile signal;
separating the tactile signal and the header from the time-division multiplexed signal received;
adjusting the separated tactile signal in accordance with the separated header; and
performing vibration based on the adjusted tactile signal.

(12) A program causing a computer to function as:
a reception unit that receives a time-division multiplexed signal obtained by performing time-division multiplexing on a signal obtained by adding a header including description of information associated with a vibration unit that uses a tactile signal including a waveform of vibration for vibrating the vibration unit that performs vibration, to the tactile signal;

a separation unit that separates the tactile signal and the header from the time-division multiplexed signal received by the reception unit;

a signal adjustment unit that adjusts the tactile signal separated by the separation unit in accordance with the header separated by the separation unit; and the vibration unit that performs vibration based on the tactile signal adjusted by the signal adjustment unit.

(13) A transmission apparatus including:

a tactile signal generation unit that generates a tactile signal including a waveform of vibration for vibrating a vibration unit;

a header generation unit that generates a header including description of information associated with the vibration unit that uses the tactile signal generated by the tactile signal generation unit;

a time-division multiplexing unit that performs time-division multiplexing on the tactile signal generated by the tactile signal generation unit and to which the header generated by the header generation unit has been added; and a transmission unit that transmits the signal time-division multiplexed by the time-division multiplexing unit.

(14) The transmission apparatus according to (13), in which the information associated with the vibration unit that uses the tactile signal is information indicating whether or not the vibration unit is to use the tactile signal for each of the vibration units.

(15) The transmission apparatus according to (14), in which the header includes description of gain information and delay information for each of the vibration units.

(16) The transmission apparatus according to (13), in which the information associated with the vibration unit that uses the tactile signal is information for identifying a plurality of vibration units that uses the tactile signal.

(17) The transmission apparatus according to (13), in which the information associated with the vibration unit that uses the tactile signal is information for identifying a group including a plurality of vibration units that uses the tactile signal.

(18) The transmission apparatus according to any of (13) to (17), in which a reception apparatus provided with the vibration unit is formed as a wearable apparatus to be worn by a user.

(19)

A transmission method including executing, by a transmission apparatus:

generating a tactile signal including a waveform of vibration for vibrating a vibration unit;

generating a header including description of information associated with the vibration unit that uses the generated tactile signal;

performing time-division multiplexing on the tactile signal generated by the tactile signal generation unit and to which the header generated by the header generation unit has been added; and transmitting the time-division multiplexed signal.

(20) A program causing a computer to function as:

a tactile signal generation unit that generates a tactile signal including a waveform of vibration for vibrating a vibration unit;

a header generation unit that generates a header including description of information associated with the vibration unit that uses the tactile signal generated by the tactile signal generation unit;

a time-division multiplexing unit that performs time-division multiplexing on the tactile signal generated by the tactile signal generation unit and to which the header generated by the header generation unit has been added; and a transmission unit that transmits the signal time-division multiplexed by the time-division multiplexing unit.

REFERENCE SIGNS LIST

1 Tactile presentation system
11 Transmission apparatus
12a to 12o, 12 Wearable reception apparatus
13a to 13o, 13 User
14 Reception area
21 Antenna
31, 31-1R to 31-3R, 31-1L to 31-3L, 31-1 to 31-n, 31a to 31c,
31o, 31p, 31w Vibration unit
41 Antenna
51 Central control unit
52 Tactile signal generation unit
53 Header generation unit
57 Signal coupling unit
58 Signal transmission unit
71 Reception unit
72 Separation unit
73 Demultiplexer
74, 74-1 to 74-n Signal adjustment unit
81 Muting unit
82 Delay unit
83 Gain processing unit
101, 111, 112 Trajectory
151 Header analysis unit
152 Gain generation unit

The invention claimed is:

1. A reception apparatus, comprising:
a vibration unit configured to vibrate;
a reception unit configured to receive a time-division multiplexed signal from an external apparatus, wherein
the time-division multiplexed signal is obtained by execution of time-division multiplexing operation on a signal obtained by addition of a header to a tactile signal,
the header includes information associated with the vibration unit,
the information associated with the vibration unit includes a value that indicates one of a presence of the tactile signal or an absence of the tactile signal, and
the vibration unit utilizes the tactile signal including a waveform of vibration for the vibration of the vibration unit;
a separation unit configured to separate each of the tactile signal and the header from the time-division multiplexed signal; and
a signal adjustment unit configured to adjust the separated tactile signal based on the separated header,
wherein the vibration unit is configured to execute the vibration based on the adjusted tactile signal.

2. The reception apparatus according to claim 1,
wherein the information associated with the vibration unit that utilizes the tactile signal is information indicating whether the vibration unit utilizes the tactile signal for each of a plurality of vibration units.

3. The reception apparatus according to claim 2, wherein the signal adjustment unit is further configured to mute the separated tactile signal based on the header, and the header indicates that the tactile signal is unutilized by the vibration unit.

4. The reception apparatus according to claim 2,
wherein the header further includes gain information for each of the plurality of vibration units and delay information for each of the plurality of vibration units.

5. The reception apparatus according to claim 2,
wherein the header further includes a gain initial value for each of the plurality of vibration units and a slope for each of the plurality of vibration units.

6. The reception apparatus according to claim 1,
wherein the information associated with the vibration unit is information for identification of a plurality of vibration units that utilizes the tactile signal.

7. The reception apparatus according to claim 6,
wherein the header further includes a gain initial value for each of the plurality of vibration units and slope for each of the plurality of vibration units.

8. The reception apparatus according to claim 1,
wherein the information associated with the vibration unit is information for identification of a group including a plurality of vibration units that utilizes the tactile signal.

9. The reception apparatus according to claim 8,
wherein the header further includes a position of the vibration and a time of the vibration,
the reception apparatus further comprises a gain calculation unit configured to:
   analyze the separated header; and
   refer to a table to calculate a gain change between the plurality of vibration units in the group, and
the signal adjustment unit is further configured to adjust the separated tactile signal based on the separated header and the calculated gain change calculated.

10. The reception apparatus according to claim 1,
wherein the reception apparatus is a wearable apparatus worn by a user.

11. A reception method, comprising:
in a reception apparatus:
receiving a time-division multiplexed signal from an external apparatus, wherein
   the time-division multiplexed signal is obtained by execution of time-division multiplexing operation on a signal obtained by addition of a header to a tactile signal,
   the header includes information associated with a vibration unit,
   the information associated with the vibration unit includes a value that indicates one of a presence of the tactile signal or an absence of the tactile signal, and
   the vibration unit utilizes the tactile signal including a waveform of vibration for vibration of the vibration unit;
separating each of the tactile signal and the header from the time-division multiplexed signal;
adjusting the separated tactile signal based on the separated header; and
executing the vibration of the vibration unit, based on the adjusted tactile signal.

12. A non-transitory computer-readable medium having stored thereon computer-executable instructions that, when executed by a processor of a reception apparatus, cause the processor to execute operations, the operations comprising:
receiving a time-division multiplexed signal from an external apparatus, wherein
   the time-division multiplexed signal is obtained by execution of time-division multiplexing operation on a signal obtained by addition of a header to a tactile signal,
   the header includes information associated with a vibration unit;
   the information associated with the vibration unit includes a value that indicates one of a presence of the tactile signal or an absence of the tactile signal, and
   the vibration unit utilizes the tactile signal including a waveform of vibration for vibration of the vibration unit;
separating each of the tactile signal and the header from the time-division multiplexed signal;
adjusting the separated tactile signal based on the separated header; and
executing the vibration of the vibration unit, based on the adjusted tactile signal.

* * * * *